US010419790B2

(12) United States Patent
Gersten

(10) Patent No.: US 10,419,790 B2
(45) Date of Patent: Sep. 17, 2019

(54) SYSTEM AND METHOD FOR VIDEO CURATION

(71) Applicant: Infinite Designs, LLC, Phoenix, AZ (US)

(72) Inventor: Adam Gersten, Phoenix, AZ (US)

( * ) Notice: Subject to any disclaimer, the term of this patent is extended or adjusted under 35 U.S.C. 154(b) by 0 days.

(21) Appl. No.: 15/875,640

(22) Filed: Jan. 19, 2018

(65) Prior Publication Data

US 2019/0230387 A1 Jul. 25, 2019

(51) Int. Cl.
*H04N 21/235* (2011.01)
*H04N 21/2343* (2011.01)
*H04N 21/231* (2011.01)
*H04N 21/854* (2011.01)
*H04N 21/84* (2011.01)
*G06F 16/783* (2019.01)
*G06F 16/78* (2019.01)

(52) U.S. Cl.
CPC ......... *H04N 21/235* (2013.01); *G06F 16/783* (2019.01); *G06F 16/7867* (2019.01); *H04N 21/231* (2013.01); *H04N 21/2343* (2013.01); *H04N 21/84* (2013.01); *H04N 21/854* (2013.01)

(58) Field of Classification Search
None
See application file for complete search history.

(56) References Cited

U.S. PATENT DOCUMENTS

| 7,320,137 | B1 * | 1/2008 | Novak | G11B 27/34 348/E7.071 |
| 8,495,683 | B2 * | 7/2013 | van Coppenolle | G06Q 30/06 725/10 |
| 8,787,618 | B2 * | 7/2014 | Tokutake | G06F 17/3079 382/103 |
| 8,973,028 | B2 * | 3/2015 | Ahn | H04H 20/10 705/14.4 |
| 9,020,824 | B1 | 4/2015 | Govil | |
| 9,098,577 | B1 | 8/2015 | Amidon et al. | |
| 9,361,353 | B1 * | 6/2016 | Aristides | G06F 17/30828 |
| 9,510,044 | B1 * | 11/2016 | Pereira | H04N 21/44008 |

(Continued)

FOREIGN PATENT DOCUMENTS

| WO | WO2006078246 | 7/2006 |
| WO | WO2016019314 | 2/2016 |
| WO | WO2016089425 | 6/2016 |

*Primary Examiner* — An Son P Huynh
(74) *Attorney, Agent, or Firm* — Christopher Mayle; John D. Houvener; Bold IP, PLLC

(57) ABSTRACT

A method of providing curated video may include tagging each of a plurality of video segments with at least one metadata tag, defining a curating rubric to be applied to a baseline sequence of video segments that is at least a subset of the plurality of video segments, the curating rubric comprising a target descriptor and a replacement descriptor associated with the target descriptor, selecting a target segment having at least one metadata tag matching the target descriptor of the curating rubric, the target segment being selected from among the baseline sequence, identifying a potential replacement segment by referring to one of the at least one metadata tags of the target segment, exchanging the replacement segment with the target segment within the baseline sequence to form a curated sequence of video segments, and encoding the curated sequence in preparation for streaming to a viewer.

19 Claims, 18 Drawing Sheets

(56) References Cited

U.S. PATENT DOCUMENTS

| | | | |
|---|---|---|---|
| 9,736,503 B1* | 8/2017 | Bakshi | H04N 21/23424 |
| 9,826,285 B1* | 11/2017 | Mishra | H04N 21/8549 |
| 2002/0046638 A1* | 4/2002 | Wright | G09B 15/023 |
| | | | 84/477 R |
| 2002/0120925 A1* | 8/2002 | Logan | A23L 2/52 |
| | | | 725/9 |
| 2004/0133909 A1* | 7/2004 | Ma | G06Q 30/0207 |
| | | | 725/34 |
| 2004/0194123 A1 | 9/2004 | Fredlund et al. | |
| 2004/0194131 A1* | 9/2004 | Ellis | H04N 5/44543 |
| | | | 725/34 |
| 2005/0039205 A1* | 2/2005 | Riedl | H04N 21/23424 |
| | | | 725/32 |
| 2005/0120389 A1 | 6/2005 | Boss et al. | |
| 2005/0132401 A1* | 6/2005 | Boccon-Gibod | G11B 27/002 |
| | | | 725/34 |
| 2006/0122842 A1* | 6/2006 | Herberger | G10H 1/368 |
| | | | 704/278 |
| 2006/0123443 A1* | 6/2006 | Hamilton | H04N 5/4401 |
| | | | 725/32 |
| 2006/0130118 A1* | 6/2006 | Damm | H04L 63/0245 |
| | | | 725/135 |
| 2006/0130119 A1* | 6/2006 | Candelore | H04N 7/163 |
| | | | 725/135 |
| 2007/0220583 A1 | 9/2007 | Bailey et al. | |
| 2007/0226761 A1* | 9/2007 | Zalewski | G06Q 30/02 |
| | | | 725/32 |
| 2009/0074235 A1* | 3/2009 | Lahr | G06F 17/30799 |
| | | | 382/100 |
| 2009/0150199 A1* | 6/2009 | Cohen | G06Q 10/0637 |
| | | | 705/7.36 |
| 2010/0223352 A1 | 9/2010 | Roka et al. | |
| 2010/0251295 A1* | 9/2010 | Amento | G11B 27/034 |
| | | | 725/38 |
| 2011/0194839 A1* | 8/2011 | Gebert | G11B 27/034 |
| | | | 386/290 |
| 2011/0246937 A1* | 10/2011 | Roberts | G11B 27/034 |
| | | | 715/810 |
| 2012/0151217 A1* | 6/2012 | Porter | H04N 21/4542 |
| | | | 713/178 |
| 2012/0163770 A1* | 6/2012 | Kaiser | H04N 21/44016 |
| | | | 386/241 |
| 2012/0213495 A1* | 8/2012 | Hafeneger | G11B 27/034 |
| | | | 386/282 |
| 2012/0324491 A1* | 12/2012 | Bathiche | H04H 60/33 |
| | | | 725/10 |
| 2013/0031582 A1* | 1/2013 | Tinsman | H04N 21/2353 |
| | | | 725/36 |
| 2013/0226865 A1* | 8/2013 | Munemann | G06F 17/30864 |
| | | | 707/609 |
| 2013/0324192 A1* | 12/2013 | Lee | H04M 1/0266 |
| | | | 455/557 |
| 2014/0068406 A1* | 3/2014 | Kornacki | G06F 17/241 |
| | | | 715/230 |
| 2014/0181668 A1* | 6/2014 | Kritt | G06F 3/0484 |
| | | | 715/719 |
| 2014/0222874 A1 | 8/2014 | Jalon et al. | |
| 2015/0134673 A1* | 5/2015 | Golan | G06F 17/30058 |
| | | | 707/748 |
| 2015/0170072 A1* | 6/2015 | Grant | G06Q 10/067 |
| | | | 705/7.36 |
| 2015/0268800 A1* | 9/2015 | O'Konski | G06F 17/30053 |
| | | | 715/716 |
| 2015/0293675 A1* | 10/2015 | Bloch | G06F 3/04847 |
| | | | 715/723 |
| 2015/0334434 A1* | 11/2015 | Green | H04N 21/2668 |
| | | | 725/34 |
| 2016/0037217 A1* | 2/2016 | Harmon | H04N 21/45457 |
| | | | 725/9 |
| 2016/0071550 A1* | 3/2016 | Daub | G11B 27/3036 |
| | | | 386/228 |
| 2016/0094875 A1* | 3/2016 | Peterson | H04N 21/44016 |
| | | | 725/41 |
| 2016/0212201 A1* | 7/2016 | Munemann | H04L 67/306 |
| 2017/0019446 A1 | 1/2017 | Son et al. | |
| 2017/0150213 A1* | 5/2017 | Cremer | H04N 21/44008 |
| 2018/0262798 A1* | 9/2018 | Ramachandra | G06F 17/30828 |

\* cited by examiner

SYSTEM AND METHOD FOR VIDEO CURATION

TECHNICAL FIELD

Aspects of this document relate generally to categorization and modification of video content.

BACKGROUND

For well over one hundred years, moving pictures have entertained viewers around the world. Advances in technology have greatly expanded the amount of available content, as well as the ways in which it is consumed. New delivery methods, such as streaming, and new modes of consumption, such as video-on-demand and "binge watching", have resulted in a demand for more and more content. Viewers crave programming that meets specific needs and desires, and often are not completely satisfied with what is available. Although the number of content providers is proliferating, it is not feasible to use conventional production methods to satisfy the entire spectrum of viewer interests.

Conventional production methods utilize the experience of an editor and the vision of a director to produce a final program, whether for television or the cinema. Satisfying viewer interests, like versions of programming with particular types of sensitive content, (e.g. profanity, sex, violence, etc.) removed, or alternate versions of a program that emphasize or diminish certain aspects of the story, or deliver a different emotional impact, have traditionally required human effort on par with the editing of the original program. Additionally, these viewer interests are not uniform; one viewer may wish for all violent scenes to be removed from a movie, while another viewer may only want gory violence to be removed. Conventional video content production methods would require a doubling of effort to produce both these versions.

Another consequence of technological advances has been the ease with which video content may be copied and transmitted, sometimes in violation of copyrights. Conventional methods of providing video content have relied on paid subscriptions, and viewers wanting free content often have to deal with the interruption of commercials or other forms of advertising that disrupt the viewing experience. Video piracy is often an attractive alternative to these hassles.

SUMMARY

According to one aspect, a method of providing curated video includes tagging each of a plurality of video segments associated with a show with at least one metadata tag, and defining a curating rubric to be applied to a baseline sequence of video segments that is at least a subset of the plurality of video segments. The curating rubric includes a target descriptor and a replacement descriptor associated with the target descriptor. The method further includes selecting a target segment having at least one metadata tag matching the target descriptor of the curating rubric. The target segment is selected from among the baseline sequence. The method also includes identifying a potential replacement segment by referring to one of the at least one metadata tags of the target segment, determining a context for the target segment using at least one of the target segment and one or more neighbor segments chosen from the baseline sequence for being sequentially proximate to the target segment, and modifying a replacement segment to substantially match the context of the target segment. The replacement segment is the potential replacement segment having at least one metadata tag consistent with the replacement descriptor associated with the target descriptor. Finally, the method includes exchanging the replacement segment with the target segment within the baseline sequence to form a curated sequence of video segments, and encoding the curated sequence in preparation for streaming to a viewer.

Particular embodiments may comprise one or more of the following features. Tagging each of the plurality of video segments associated with the show may further comprise computationally generating, for each video segment, a probationary observation of at least one observation type that describes the video segment as considered using an artificial judge comprising at least one of natural language processing, facial recognition, chromatic decomposition, emotion recognition through machine vision, and tonal decomposition of at least one of an audio track and a scoring track. Tagging each of the plurality of video segments may further comprise subjectively validating observations for each of the at least one observation type by presenting a random sampling of probationary observations to a plurality of viewers for confirmation. The random sampling may be statistically representative and/or non-exclusionary of a plurality of distinct observations made of the plurality of video segments. Tagging each of the plurality of video segments may also comprise recording each validated observation of each validated observation type as one of the at least one metadata tags for the associated video segment in response to the confirmation of substantially all of the random sampling for said observation type by the plurality of viewers. The method may also include generating a training data set based upon probationary observations that received negative responses from the plurality of viewers, and refining the computational generation of probationary observations by applying the training data set to the artificial judge. The at least one observation type may comprise at least one of a product avatar, a sensitive content, a tone, and a character. One of the at least one metadata tag of one video segment of the plurality of video segments may describe a replaceable product by specifying at least one of a product type, a temporal data, and a geometric data. The replaceable product may be a product visible in the video segment whose replacement may be without legal constraint. The target descriptor may comprise at least one of a target product type, a target duration, and a target geometry. The replacement descriptor associated with the target descriptor may comprise at least one of a replacement product image, a replacement product video segment, and a replacement product model. Identifying the potential replacement segment may comprise determining whether the replacement segment has been partially generated, and may further comprise generating and storing a partially generated replacement segment upon determination that the replacement segment may not have been partially generated. The partially generated replacement segment may include the target segment with the replaceable product removed. Modifying the replacement segment to substantially match the context of the target segment may further include retrieving the replacement segment and/or generating the replacement segment using the partially generated replacement segment. Tagging each of the plurality of video segments associated with a show may further comprise determining whether a video segment of the plurality of video segments comprises a visible product, identifying the visible product, determining whether the visible product is replaceable by searching at least one legal agreement associated with the show, and/or tagging the video segment with at least one metadata tag describing the replaceable product. One of the at least one metadata tag of one video segment of the plurality of video segments may describe a sensitive content by specifying at least one of a content type, a content medium, a temporal data, and a geometric data. The sensitive content may consist of a representation of at least one of violence, substance abuse, profanity, nudity, sex, and content consequential to content rating. The content medium may specify either aural or visual. The target descriptor may comprise a target content type. The replacement descriptor associated with the target descriptor may comprise a lowest allowable replacement source. The replacement segment may be the potential replacement segment having a replaced content type metadata tag matching the target content type and/or a content replacement source metadata tag that at least meets the lowest allowable replacement source of the replacement descriptor. The method may further comprise generating the replacement segment if a potential replacement segment cannot be found and/or the lowest allowable replacement source of the replacement descriptor allows for system-generated content replacement, generating the replacement segment comprising one of removing the sensitive content from the target segment, obscuring the sensitive content within the target segment, and replacing the sensitive content, in accordance with the lowest allowable replacement source and/or based upon the one or more metadata tags of the target segment. One of the at least one metadata tag of each video segment of the plurality of video segments may describe a mood by specifying at least an emotion type and/or an emotional intensity associated with the emotion type. The replacement descriptor may comprise a desired net mood that may have at least one desired emotion type, and a desired emotion intensity for each desired emotion type. The target descriptor may comprise at least one target emotion type, and/or a target emotion intensity for each target emotion type. Each of the at least one target motion type may be either counter to one of the at least one desired emotion types or equal to one of the at least one desired emotion types and may have an associated target emotion intensity different than the associated desired emotion intensity. Identifying the potential replacement segment may comprise identifying at least one potential replacement segment. The replacement segment may be the potential replacement segment of the at least one potential replacement segment exhibiting a mood change toward the desired net mood of he curating rubric. The mood change may be the mood of the target segment subtracted from the mood of the potential replacement segment. Encoding the curated sequence first may comprise determining whether the curated sequence has a net mood substantially equal to the desired net mood. The net mood may be the sum of moods associated with all segments within the curated sequence. One of the at least one metadata tag of each video segment of the plurality of video segments may be a narrative element indicating one of a plot line, a character, and a fungibility. The target descriptor may comprise a target narrative element that may indicate one of a target character, a target plot line, and a target fungibility. The replacement descriptor associated with the target descriptor may comprise one of a character attenuation tag indicating the removal of the target character, a plot attenuation tag indicating the removal of the target plot line, and a fungible replacement tag. Finally, modifying the replacement segment to substantially match the context of the target segment may further comprise applying a watermark unique to the viewer to the replacement segment. The watermark may be codec resistant.

According to another aspect of the disclosure, a method of providing curated video includes tagging each of a plurality of video segments associated with a show with at least one metadata tag, and defining a curating rubric to be applied to a baseline sequence of video segments that is at least a subset of the plurality of video segments. The curating rubric includes a target descriptor, a replacement descriptor associated with the target descriptor, and an acceptability threshold. The method also includes selecting a target segment having at least one metadata tag matching the target descriptor of the curating rubric. The target segment is selected from among the baseline sequence. The method further includes identifying a potential replacement segment by referring to one of the at least one metadata tags of the target segment, and determining if the acceptability threshold of the curating rubric would be satisfied by replacing the target segment with a replacement segment. The replacement segment is the potential replacement segment having at least one metadata tag matching the replacement descriptor associated with the target descriptor. Additionally, the method includes determining a context for the target segment using at least one of the target segment and one or more neighbor segments chosen from the baseline sequence for being sequentially proximate to the target segment, modifying the replacement segment to substantially match the context of the target segment, exchanging the replacement segment with the target segment within the baseline sequence to form a curated sequence of video segments, and encoding the curated sequence in preparation for streaming to a viewer.

Particular embodiments may comprise one or more of the following features. Tagging each of the plurality of video segments associated with the show may further comprise determining whether a video segment of the plurality of video segments comprises a visible product, identifying the visible product, determining whether the visible product is a replaceable product, and/or tagging the video segment with at least one metadata tag describing the replaceable product. One of the at least one metadata tag of one video segment of the plurality of video segments may describe the replaceable product by specifying at least one of a product type, a temporal data, and a geometric data. The replaceable product may be a product visible in the video segment whose replacement is without legal constraint. The target descriptor may include at least one of a target product type, a target duration, and a target geometry. The acceptability threshold may be a lowest acceptable product impact score. The replacement descriptor associated with the target descriptor may comprise at least one of a replacement product image, a replacement product video segment, and a replacement product model. Identifying the potential replacement segment may comprise determining whether the replacement segment has been partially generated, and may further comprise generating and storing a partially generated replacement segment upon determination that the replacement segment has not been partially generated. The partially generated replacement segment may comprise the target segment with the replaceable product removed. Determining if the acceptability threshold would be satisfied may comprise determining if a weighted product impact score associated with the potential replacement segment is greater than the lowest acceptable product impact score. The weighted product impact score may be a function of a fractional area of a frame, a duration, and a visibility weighting. Modifying the replacement segment to substantially match the context of the target segment may further comprise one of retrieving the replacement segment and generating the replacement segment using a partially generated replacement segment. One of the at least one metadata tag of one video segment of the plurality of video segments may describe a sensitive content by specifying at least one of a content type, a content medium, a temporal data, and a geometric data. The sensitive content may consist of a depiction of at least one of an act of violence, an act of substance abuse, an act of profanity, an act of nudity, a sexual act, and an act consequential to content rating. The content medium may specify either aural or visual. The target descriptor may comprise a target content type. The acceptability threshold may describe a lowest allowable replacement source. The replacement segment may be the potential replacement segment having a replaced content type metadata tag matching the target content type and/or a content replacement source metadata tag that at least meets the acceptability threshold. The method may comprise generating the replacement segment if a potential replacement segment cannot be found and the acceptability threshold allows for system-generated content replacement, generating the replacement segment comprising one of removing the sensitive content from the target segment, obscuring the sensitive content within the target segment, and/or replacing the sensitive content, in accordance with the acceptability threshold and/or based upon the one or more metadata tags of the target segment. One of the at least one metadata tag of each video segment of the plurality of video segments may describe a mood by specifying at least an emotion type and an emotional intensity associated with the emotion type. The replacement descriptor may comprise a desired net mood having at least one desired emotion type, and a desired emotion intensity for each desired emotion type. The acceptability threshold may describe a smallest acceptable mood shift. The target descriptor may comprise at least one target emotion type, and a target emotion intensity for each target emotion type. Each of the at least one target motion type may be counter to one of the at least one desired emotion types or equal to one of the at least one desired emotion types and having an associated target emotion intensity different than the associated desired emotion intensity. Identifying the potential replacement segment may comprise identifying at least one potential replacement segment. The replacement segment may be the potential replacement segment of the at least one potential replacement segment exhibiting a mood change toward the desired net mood of the curating rubric. The mood change may be the mood of the target segment subtracted from the mood of the potential replacement segment. Encoding the curated sequence may first comprise determining whether the curated sequence has a net mood shift within the acceptability threshold. The net mood shift may be the difference between the sum of moods associated with all segments within the curated sequence and the sum of moods associated with all segments within the baseline sequence. Lastly, encoding the curated sequence may comprise encoding the replacement segment in combination with pre-encoded segments of the baseline sequence.

According to yet another aspect of the disclosure, a video curating system includes a storage comprising a plurality of video segments associated with a show, each video segment of the plurality of video segments having at least one metadata tag. The system further includes a video curating server communicatively coupled to the storage and a network and having a first processor and a first memory. The video curating server is configured to receive a curating rubric to be applied to a baseline sequence of video segments that is at least a subset of the plurality of video segments, the curating rubric received through the network from a user device and comprising a target descriptor and a replacement descriptor associated with the target descriptor. The server is further configured to select a target segment from among the baseline sequence, the target segment having at least one metadata tag matching the target descriptor of the curating rubric, as well as identify a potential replacement segment by referring to one of the at least one metadata tags of the target segment. The server is also configured to determine a context for the target segment using at least one of the target segment and one or more neighbor segments chosen from the baseline sequence for being sequentially proximate to the target segment. Additionally, the server is configured to modify a replacement segment to substantially match the context of the target segment. The replacement segment is the potential replacement segment having at least one metadata tag consistent with the replacement descriptor associated with the target descriptor. Finally, the server is configured to exchange the replacement segment with the target segment within the baseline sequence to form a curated sequence of video segments, and encode the curated sequence in preparation for streaming to a viewer device through the network.

Particular embodiments may comprise one or more of the following features. The video curating server may be configured to tag each of the plurality of video segments with at least one metadata tag. The video curating server may be further configured to automatically generate, for each video segment, a probationary observation of at least one observation type that may describe the video segment. The probationary observation may be generated using at least one of natural language processing, facial recognition, chromatic decomposition, emotion recognition through machine vision, and tonal decomposition of at least one of an audio track and a scoring track. The server may be configured to stream, over the network, a random sampling of probationary observations for each of the at least one observation type to a plurality of viewer devices for subjective validation. The random sampling may be statistically representative and/or non-exclusionary of a plurality of distinct observations made of the plurality of video segments. The server may be configured to receive a plurality of responses from the plurality of viewer devices in response to the transmission of the random sampling of probationary observations. Finally, the server may be configured to record each validated observation of each validated observation type as one of the at least one metadata tags for the associated video segment in response to the validation of substantially all of the random sampling for said observation type through the plurality of viewer devices.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DETAILED DESCRIPTION

Figure 1:
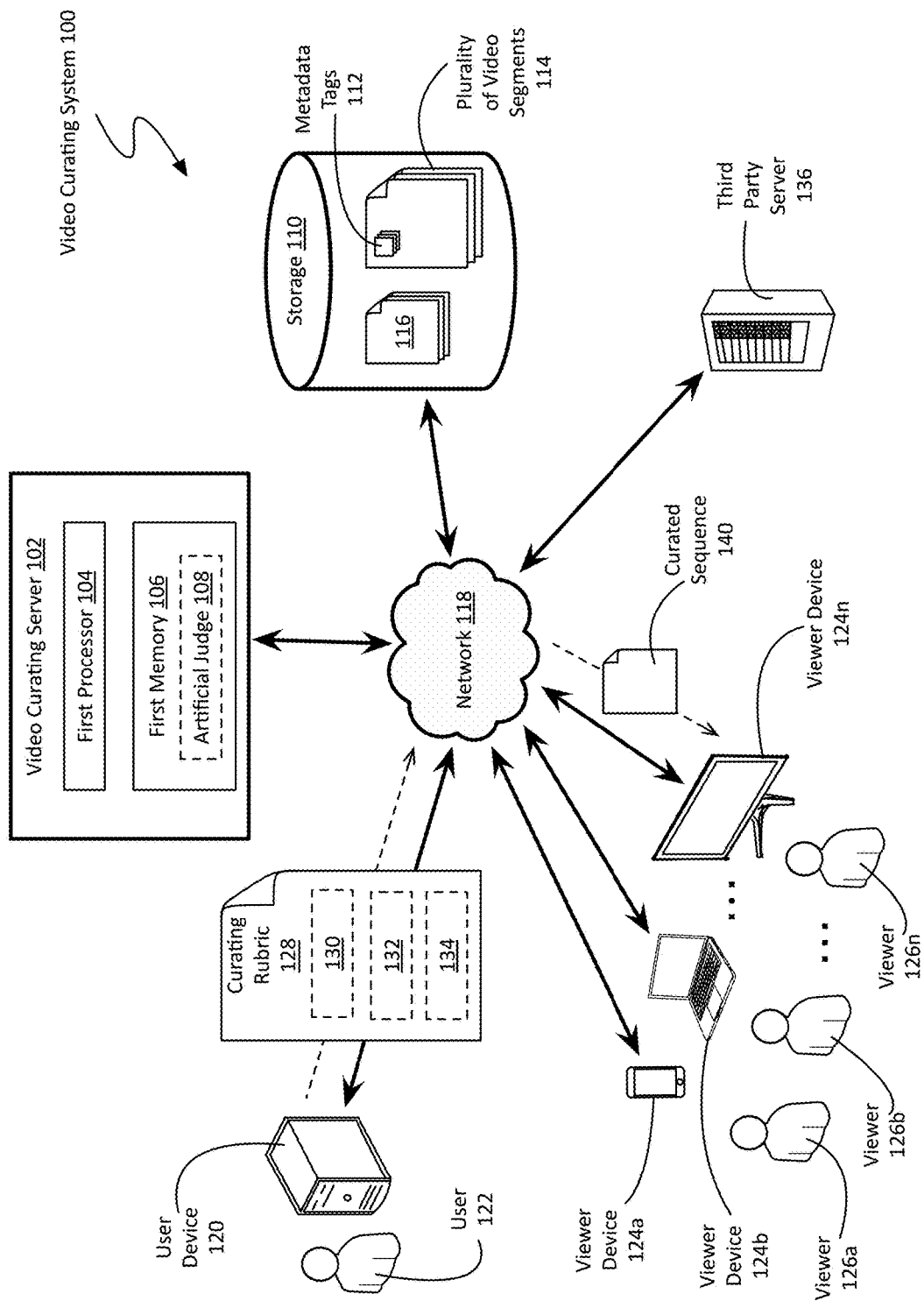
FIG. 1 is a network view of a video curating (VC) system.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

For well over one hundred years, moving pictures have entertained viewers around the world. Advances in technology have greatly expanded the amount of available content, as well as the ways in which it is consumed. New delivery methods, such as streaming, and new modes of consumption, such as video-on-demand and "binge watching", have resulted in a demand for more and more content. Viewers crave programming that meets specific needs and desires, and often are not completely satisfied with what is available. Although the number of content providers is proliferating, it is not feasible to use conventional production methods to satisfy the entire spectrum of viewer interests.

Conventional production methods utilize the experience of an editor and the vision of a director to product a final program, whether for television or the cinema. Satisfying viewer interests, such as versions of programming with particular sensitive types of content, such as profanity, sex, and violence removed, or alternate versions of a program that emphasize or diminish certain aspects of the story, or deliver a different emotional impact, have traditionally required effort on par with the editing of the original program. Additionally, these viewer interests are not uniform; one viewer may wish for all violent scenes removed from a movie, including suggestion of off-screen violence, while another viewer may only want gory violence to be removed. Conventional video content production methods would require a doubling of effort to produce those two versions.

Another consequence of technological advances has been the ease with which video content may be copied, sometimes in violation of copyrights. Conventional methods of providing video content have relied on paid subscriptions, and viewers wanting free content often have to deal with the interruption of commercials or other forms of advertising that disrupt the viewing experience. Video piracy is often an attractive alternative to these hassles.

Contemplated herein is a system and method for the dynamic creation of video content. The system utilizes the vast amount of content captured in the process of creating a video program, most of which traditionally has been left on the cutting room floor. Viewers are able to specify their desires, and the system generates a sequence of video segments that are tailored to them specifically. Furthermore, the system provides a new method for monetization through directed, personalized advertisements in the form of product placement within the programming, without having to interrupt the viewing experience. Such personalized, subtle advertising may prove more effective than commercial breaks, in addition to better received by the viewers.

FIG. 1 is a network view of a non-limiting example of a video curating (VC) system. As shown, the system 100 comprises a VC server 102 having a first processor 104 and a first memory 106, as well as a storage 110. In some embodiments, the storage 110 may be part of, or local to, the server 102. In other embodiments, including the embodiment shown in FIG. 1, the VC server 102 and the storage 110 may be separate devices, communicatively coupled through a network 118 (e.g. LAN, Internet, etc.). The storage 110 may be a cloud storage solution. In some embodiments, storage 110 may comprise a plurality of storage devices controlled and maintained by a plurality of video content providers (e.g. networks, studios, etc.). In some embodiments, the storage 110 may be a database.

As shown, storage 110 comprises a plurality of video segments 114. According to various embodiments, at least some of the video segments 114 contained in storage 110 are tagged with metadata 112. Video segments 114 and metadata tags 112 will be discussed in greater detail with respect to FIGS. 2 and 3, below. In some embodiments, storage 110 may also contain a plurality of legal agreements 116, pertinent to marketing and product placement. The creation of dynamic product placement using the VC server 102 will be discussed in greater detail with respect to FIGS. 6 and 7, below.

The metadata 112 attached to video segments 114 may be obtained in a variety of manners. For example, the video segments 114 may be tagged manually, perhaps during the editing process where the original program was created. In other embodiments, including the non-limiting example shown in FIG. 1, the VC system 100 may use artificial intelligence, in the form of an artificial judge 108, to analyze and tag video segments with pertinent metadata. Computationally generated metadata tags and the artificial judge 108 will be discussed in greater detail below with respect to FIG. 5.

Traditional methods of preparing video programs for viewers, whether cinema or television, have resulted in a single piece of media that does not change after the content creator has finished the filming and editing process. Advantageous over conventional methods of preparing video programing, the VC system 100 and methods can create a customized video program tailored to the tastes and needs of a specific viewer or viewers, a marketing campaign, a content provider, or even a parent or guardian of a young viewer, making use of materials left over after the initial creation. This customized video, herein after referred to as a curated video sequence 140, is generated by the VC system 100 according to the parameters specified in a curating rubric 128.

As shown, the curating rubric 128 may be provided by a user 122 through a user device 120 communicatively coupled to the VC server 102 through the network 118. According to various embodiments, a user device 120 may be a mobile computing device (e.g. phone, tablet, etc.), a desktop computing device (e.g. desktop computer, laptop, etc.), a smart device (e.g. smart TV, etc.), a specialized computing device (e.g. game console, video streaming receiver, home automation node, etc.), or a remote server controlled by a device local to the user (e.g. Amazon Alexa, Google Home, Apple Siri, etc.), and the like. In some embodiments, the VC server 102 may provide a web portal through which a user 122 may define a curating rubric 128. In other embodiments, the user may define a curating rubric 128 through an application that interfaces with the VC server 102 (e.g. through a VC server API, etc.). In some embodiments, the curating rubric 128 may be defined by a third party, such as an advertisement provider, or a content provider. In still other embodiments, the curating rubric 128 may be provided by the party controlling the VC server 102. Specific examples of the curating rubric 128 will be discussed in greater detail with respect to FIGS. 7, 9, 11, and 12.

The curating rubric 128 comprises at least one target descriptors 130, and at least one replacement descriptor 132 associated with each target descriptor 130. The target descriptor(s) 130 specify metadata tags of video sequences to flag for change as part of the VC process. The replacement descriptor(s) 132 associated with each target descriptor 130 describe the content that could be used in place of the flagged segments, or how the flagged segments could be modified. In some embodiments, the curating rubric 128 also comprises an acceptability threshold 134, which defines the minimal acceptable change, or the roughest acceptable change. If the acceptability threshold 134 cannot be met, then the curated sequence 140 is not provided and the user 122 is informed why their request cannot be fulfilled. As an option, the system may offer suggested alternate choices that best match their requested criteria, using the video segments available to the system at that time. Specific examples of acceptability thresholds 134 will be discussed below.

The curating rubric 128 may be used by the VC server 102 to modify a predefined sequence of video segments into a curated sequence 140. Based upon the parameters specified in the curating rubric 128, the predefined sequence is modified, defining a curated sequence 140. In some instances, new video segments 114 may be created to be part of the newly defined curated sequence 140. The curated sequence 140 is then provided to one or more viewer 126 through one or more viewer devices 124 communicatively coupled to the VC server 102 through the network 118. In some embodiments, the viewer 126 and the user 122 may be the same individual, and the viewer device 124*a* may be the same as the user device 120. In the context of the present description and the claims that follow, a viewer device 124 may be any device capable of displaying a sequence of video segments. Examples of viewer devices 124 include, but are not limited to, mobile computing devices (e.g. phone, tablet, etc.), desktop computing device (e.g. desktop computer, laptop, etc.), smart devices (e.g. smart TVs, advanced media players, etc.), specialized computing devices (e.g. game console, video streaming receiver, home automation node, digital cinema projectors, etc.), and the like. In some embodiments, the VC server 102 may provide the curated sequence 140 to a viewer 126 through a web portal, while in other embodiments, the sequence 140 may be provided through an application.

In some embodiments, the curated sequence 140 is streamed to the viewer device 124 and shown as it is received, while in other embodiments, the curated sequence 140 may be buffered at the viewer device 124 and shown once it has been completely received. In some embodiments, the curated sequence 140 does not change once the VC server 102 has started to provide it to a viewer 126*a*. In other embodiments, the viewer 126*a* (here also the user 122) may modify the parameters of the curating rubric 128 for the video sequence being viewed, such that subsequent video segments in the sequence are chosen and/or modified according to the modified rubric. In this way, a viewer/user may tweak the settings of the curated sequence 140 as it is being viewed. As a more extreme example, a content creator may create dynamic programming, where viewers 126 may chose from various narrative paths to arrive at a number of different endings; the viewer choices modify a curating rubric used to assemble the curated sequence 140 being provided to the viewer. As an option, the curating rubric 128 may be defined by the results of polling an audience, rather than the choice of a single user. In this way, an audience (e.g. distributed viewers of a show, individuals in a theater, etc.) could collectively choose the path of the narrative, or even the tone, as will be discussed in greater detail below.

According to various embodiments, a user 122 may define a curating rubric 128 to modify a predefined sequence of video segments. In some embodiments, the predefined sequence may be a baseline sequence, meaning a sequence of video segments as composed by the original content provider (e.g. broadcast version, theatrical release version, directors cut, etc.). The predefined sequence may also be a curated sequence 140 that was previously defined by a previous curating rubric 128. In some embodiments, curating rubrics 128 and/or the curated sequences 140 they define, may be stored in the VC system 100, where they may be shared and further modified by other viewers 126. In some embodiments, a viewer 126*a* may be provided with a list of sequences to view, including one or more baseline sequences, and a list of the most popular, most viewed, and/or most shared curated sequences. The list may also include sequences curated by a particular individual (e.g. celebrity, artist, director, etc.) or entity (e.g. Parents Television Council, the Autism Association, etc.) and may have a particular theme.

Some embodiments of the VC system 100 comprise a method for viewers 126 to provide feedback on whether or not the curated sequence 140 met the desired goals behind the curating rubric 128. Such feedback may be used to refine methods of automatically generating metadata tags 112, as will be discussed in greater detail below. Such feedback may also be used to refine tags 112 already applied to segments in the sequence 140 shown to the viewer 126*a*.

As shown, the VC system 100 may also be communicatively to one or more third party servers 136. In some embodiments, curating rubrics 128 and/or video segments 114 may be provided to the VC system 100 by third party servers 136. One example of a third party server 136 may be an ad server, that may provide images and other media to be used as part of a curated product placement campaign for a specific viewer or viewers. The products or advertisements being inserted into the curated sequence 140 may be based upon historical user observations (e.g. purchase history, browsing history, survey information, demographic information, etc.) gathered by the third party through channels outside the VC system. In some embodiments, the same methods and technology used to profile and track users to provide targeted web advertising may be employed to insert targeted product placement or advertisements within a video sequence. The use of the VC system 100 for product placement will be discussed in greater detail below.

In other embodiments, the third party server 136 may belong to a content provider, such as a television network or a movie studio. The VC system 100 may provide usage information pertinent to licensing agreements governing the use of content. The VC system 100 may also provide content providers with information regarding the preferences of its viewers with respect to the content provided by the content provider. For example, statistics generated by the examination of many different curating rubrics 128 may inform content providers about a disliked plot line or a desired emotional tone, which may inform the creation of content in the future. This may be advantageous over conventional methods of post-viewing surveys, as the viewer is able to rate based on experience, rather than theory (e.g. the viewer can watch a different version and comment on it, rather than guess what their reaction would be to the alternate version.) In some embodiments, the viewers could be presented with a survey after viewing a curated version of a program, and may be incentivized to participate with credits towards viewing another program in the future. In other embodiments, viewers could provide real-time feedback while viewing a program. For example, viewers may be prompted to indicate their rating of a single aspect (e.g. accuracy of curated sequence to the rubric, satisfaction with curated sequence, etc.) using a dial interface.

Figure 2:
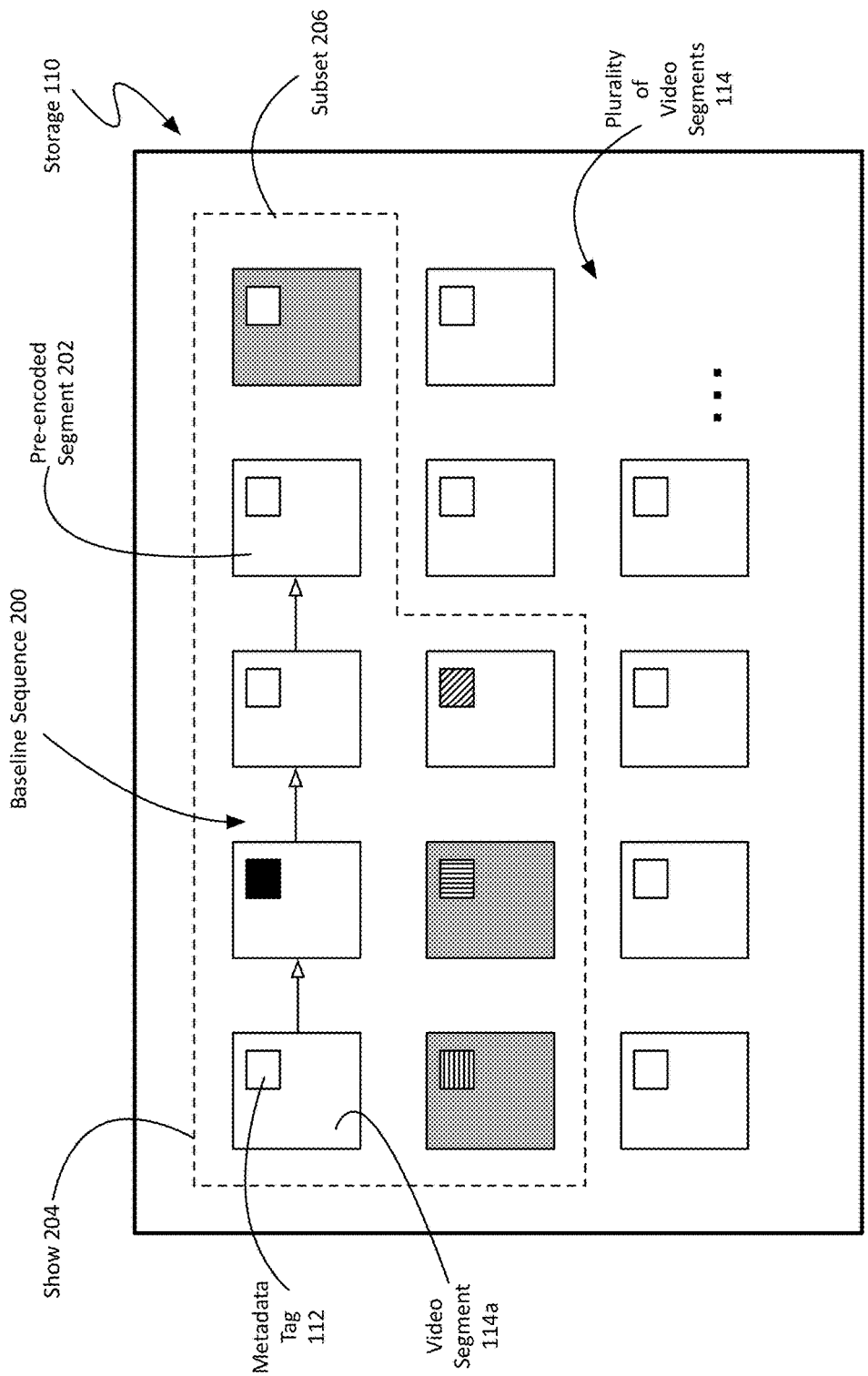
FIG. 2 is a schematic view of a non-limiting example of a storage.

FIG. 2 is a schematic view of the contents of a non-limiting example of the storage 110 of a VC system 100. Specifically, FIG. 2 shows a plurality of video segments 114 being stored. In some embodiments, the storage 110 may also comprise a plurality of legal agreements 116, as mentioned above, but not shown in FIG. 2.

The storage 110 may comprise a plurality of video segments 114 that are associated with one or more shows 204. In the context of the present description, a show 204 is a collection of related video segments. Examples of shows 204 include, but are not limited to, television episodes, television seasons, television series, movies, movie series (e.g. a collection of sequels, a collection of related movies such as the Marvel Cinematic Universe, etc.), sports leagues, events involving a particular sport team, a sporting event, a news cycle, news covering a particular event, and the like. As shown, a show 204 may be represented as a subset 206 of the plurality of video segments 114 stored in storage 110.

Furthermore, in the context of the present description and the claims that follow, a video segment 114 is a collection of images (e.g. frames) joined together in a file having a video format. In some embodiments, a video segment may be a single shot, meaning a single clip of video shot by a single camera. In other embodiments, a video segment may be a scene, meaning a collection of shots grouped together based on theme or chronology. Shots are used by traditional editors to form scenes, which make up programs such as episodes or movies. For example, a scene where the protagonist bolsters his troops for one final attack may be composed of shots of him delivering his speech as well as shots of the soldiers reacting to his words. In some embodiments, the VC system 100 may work with video segments that may be either a shot or a scene. As an option, the metadata tags 112 of a video segment 114 may identify whether it is a shot or a scene, to facilitate the locating of a potential replacement, determining a context, and/or other operations to be discussed below.

A user 122 may define a curating rubric 128 to be applied to a predefined sequence of video segments, such as a baseline sequence 200. In the context of the present description and the claims that follow, a baseline sequence 200 is a sequence of video segments 114 as composed by the original content provider (e.g. broadcast version, theatrical release version, directors cut, etc.). The predefined sequence may also be a curated sequence 140 that was previously defined by a previous curating rubric 128.

As shown, some of the video segments 140 have been pre-encoded 202. Sequences are provided to viewers after having been encoded in any of the video codecs known in the art. In some embodiments, the video segments 114 may be stored in storage 110, edited and manipulated in a raw, uncompressed, or lossless format, to preserve detail and clarity and to facilitate the matching of contexts, as will be discussed below. In other embodiments, pre-encoded video segments 202 may be stored, and combined with modified and encoded segments to form the curated sequence 140. This may be advantageous, as it may be more computationally efficient to encode segments a single time, and reuse them. Such efficiency may depend upon the volume of use of a segment. For example, in one embodiment, a pre-encoded version of segment may be stored only once demand for said segment, in that form, rose above a predefined limit. Otherwise, it may be more efficient to re-encode the segment on demand rather than store it in various formats for streaming to various endpoints (e.g. viewer devices 124, etc.).

The non-limiting example shown in FIG. 2 includes a show 204 (or a subset 206) comprising a baseline sequence 200 made up of 4 video segments, as well as 4 video segments associated with that show. These four additional segments may be inserted in the place of one or more segments in the baseline sequence 200, depending upon the parameters defined in a curating rubric 128. This example, with a four-segment baseline and 4 additional segments, is using reduced numbers, for simplicity. In practice, the subset 206 associated with a show 204 may have dozens, if not hundreds, of video segments 114 having metadata tags 112.

The additional video segments shown within subset 206 may come from the initial filming process (e.g. shots not used in the editing process, bloopers, additional establishing shots, etc.), or may originate from a different production, but have been tagged such that they are compatible with the show 206. For example, an establishing shot of a city, shot at the appropriate time of day, season, and era (e.g. no SUVs in a desert shot to be used in a period western, etc.), may be included in the subset 206. It should be noted that shows 204 and subsets 206 are organizational rather than literal, meaning a video segment 114 may be grouped with more than one show or subset. Sequences, however, may be stored as a single file as well as a list pointing to an ordered series of video segments, or both, according to various embodiments. As an option, such a storage arrangement may be determined by the need for efficient use of bandwidth, processor power, and storage space, as discussed above.

Not shown in FIG. 2, but as a part of various embodiments, shows 204 may also include, and the storage 110 may also contain, audio segments. Audio segments may include, but are not limited to, alternative dialog, actors saying alternatives to profanity, alternate soundtracks, and the like. As will be discussed below, in some cases, a curating rubric 128 may require only the replacement of spoken dialog (e.g. to remove profanity, etc.), which could be accomplished with a substitution of a segment of audio. In some embodiments, the video segments 114 have audio streams attached to them, while in others the video and audio may be stored separately, to be combined after modifications have been made and in preparation for being presented to one or more viewers 126.

Figure 3:
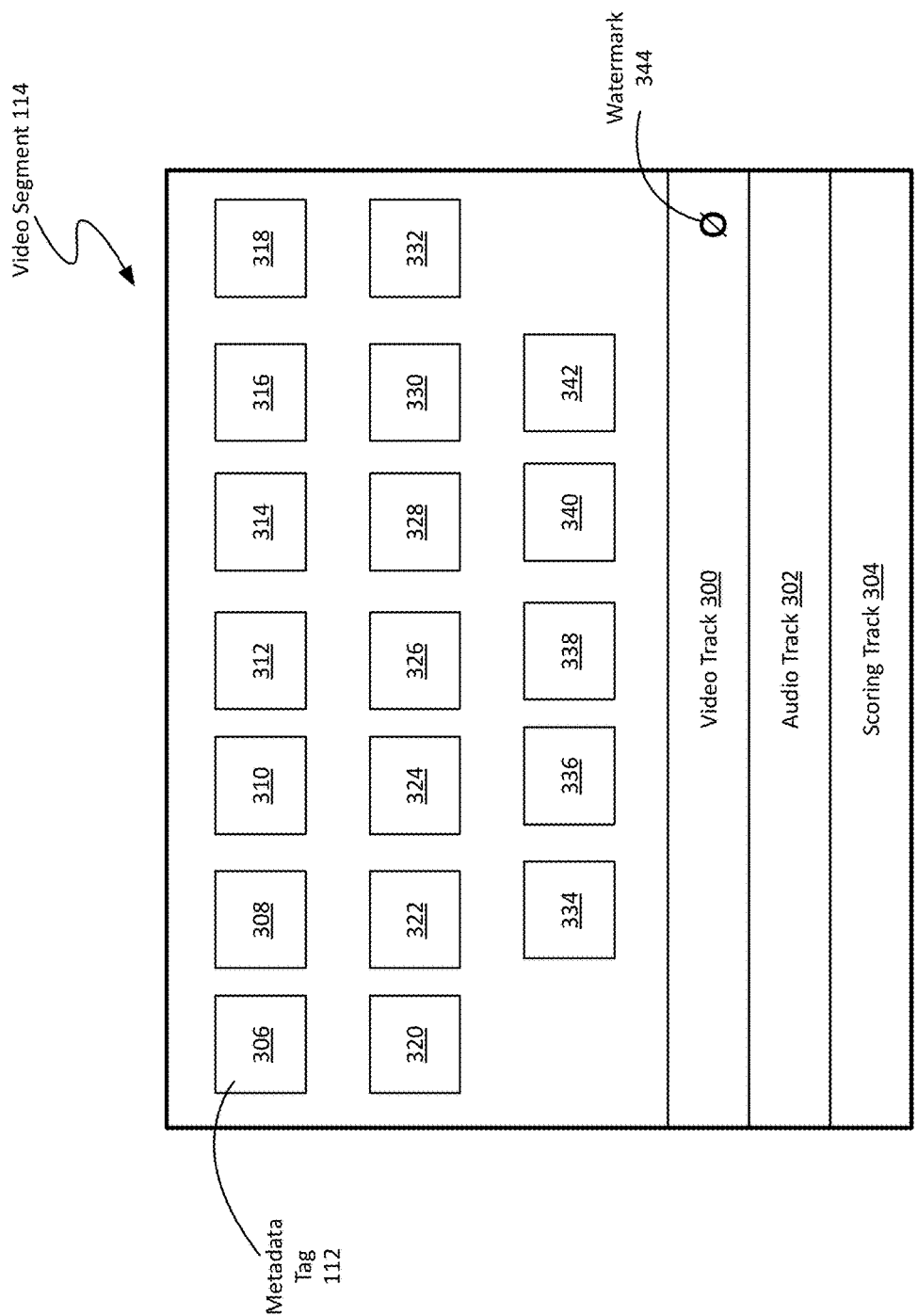
FIG. 3 is a schematic view of a non-limiting example of a video segment.

FIG. 3 is a schematic view of a non-limiting example of a video segment 114. As shown, the video segment 114 comprises a video track 300, as well as one or more metadata tags 112. In some embodiments, the video segment 114 may also comprise additional tracks, such as an audio track 302 comprising dialog and other sound effects, as well as a scoring track 304 comprising backing music. The inclusion of these as separate tracks may facilitate modifications required by a curating rubric 128.

According to various embodiments, a video segment 114 may have one or more metadata tags 112. These tags allow the VC server 102 to identify target segments and replacement segments so a curated sequence 140 may be provided to a viewer 126. Exemplary metadata tags may describe properties and aspects that include, but are not limited to, a product type 310, temporal data 312, geometric data 314, a visibility weighting 316, a fractional area 318, a content type 320, a content medium 322, a temporal data 324, a geometric data 326, a replaced content type 328, a content replacement source 330, an emotion type 332, an emotional intensity associated with an emotion type 334, a plot line 336, a character 338, a fungibility 340, and a chronology 342. These examples will be discussed further below, but it should be noted that a metadata tag 112 may describe any aspect depicted by, associated with, or related to the creation of, a video segment 114. Furthermore, a metadata tag 112 of a video segment 114 may comprise a single piece of data, multiple pieces of related data, or a time series or function that provides data throughout the video segment. Tags having a time series or function may be used to describe an aspect of the video segment that changes through the duration of the segment, such as the location of an object.

Before discussing the listed examples of metadata provided above, it should be noted that, while stating that some embodiments comprise a set of metadata tags, it should be understood that some or all of these tags, and others unmentioned, can be combined within some embodiments of the VC system 100. For example, a VC system may be configured to handle product placement tags as well as sensitive content tags, according to some embodiments. Furthermore, while the following discussion may be framed in terms of a single instance of the example tag being applied to a video segment, it should be understood that multiple tags of the same kind may be attached to a segment. For example, video segments depicting multiple products may have multiple sets of product related tags. As another example, video segments containing multiple characters or involving multiple plot lines may have multiple narrative related tags.

As shown, one exemplary metadata tag is a reference tag 306. A reference tag 306 on a first video segment may point to other video segments 114 that are related to the first segment. For example, a reference tag 306 could point to other takes of the same shot, or other alternatives to a scene. In certain productions, actors are encouraged to ad lib segments of dialog; a reference tag 306 may point to video segments containing alternate takes of ad-libbed content that could be put in place of the first segment. In some embodiments, a reference tag 306 may also be used to indicate the video segments place in a defined sequence. As an option, a reference tag 306 may indicate both the nature of the reference (e.g. sequence, alternate, etc.), as well as refer to one or more specific video segments. Video segments may be referred to using an index or other schema compatible with the method in which they are stored. Reference tags 306 may facilitate the creation of a curated sequence 140. Once target segments have been identified, the universe of potential replacement segments may be quickly assembled by looking to the reference tags 306 of the target segments.

According to various embodiments, video segments 114 may be tagged with metadata describing elements of the segment itself, rather than the content. For example, in some embodiments, a video segment 114 may include a duration tag 308, indicating the length of the segment, using units of time or number of frames. Such information may be advantageous for some VC operations. For example, the swapping of fungible content, such as establishing shots, color commentary or background clips in sports, improvised scenes, and the like, may be facilitated by knowing the duration of the segments. The swapping of segments having identical or similar duration may preclude the need for additional adjustments, such as scoring and background sound effects.

Video segments 114 may also be tagged with metadata 112 describing the content of the video segment. For example, in some embodiments, tags may indicate the presence of some form of commercial product. One example of such a tag is a product type tag 310, describing the type of product visible in the segment (e.g. canned beverage, television, furniture, car, etc.). Another example is a temporal data tag 312 describing when (e.g. time code, frame number, etc.) in the video segment a product is visible (and may also indicate the duration the product is visible within the segment). Yet another example is a geometric data tag 314, which describes the how the depiction of the product evolves over time, within the video segment. For example, in some embodiments, a geometric data tag 314 may be a series of data showing the evolving presentation, and may be a time series, a temporal function, or a series of key-frame definitions from which the evolution may be derived. In some embodiments, the geometric data 314 may describe the evolution of the silhouette of the product (e.g. shape and location within the camera frame), while in others geometric data 314 may comprise a three-dimensional model (or a series of models, if the product is deformed within the segment) and one or more data points indicating the evolution of the product position, product orientation, and relative camera position. Such data may facilitate the generation of a replacement product that blends in with the original video segment.

Another example of a metadata tag 112 describing a product is a visibility weighting tag 316. In the context of the present description and the claims that follow, a visibility weighting tag 316 may comprise a single value, a series of values, or a temporal function that describes the degree of useful visibility of a product visible in the video segment. Not all depictions of a product are equal. For example, a box of cereal that is visible in a video segment, but is mostly visible from the side with the front logo and name viewed at an angle, the visibility weighting may be lower than it would be for a segment where the name and logo of the cereal is clearly visible.

In some embodiments, the visibility weighting tag 316 may ignore how much of the frame is taken up by the product. In some of these embodiments, a fractional area tag 318 may be used. A fractional area tag 316 describes what portion of the video frame is taken up by the product. In some embodiments, the fractional area tag may be a single value that scales with duration and average frame area used. In other embodiments, the fractional area tag may be a series of data points, a function, or the like, that describes the evolution of the frame area used by the product throughout the video segment. In still other embodiments, the fractional area tag 318 may include statistical data concerning the frame area used throughout the segment, including but not limited to average area, maximum area, minimum area, standard deviation, and the like. The use of a fractional area tag 318 may be advantageous when dealing with products having some form of branding that is omnidirectional. For example, a bottle of Coca-Cola may have a logo on one side, but the iconic shape of the bottle makes the brand recognizable from many orientations, making the fractional area 318 more instructional than a visibility weighting tag 316. As a counter example, a box of flavored rice mix may only be recognizable from the front, making the visibility weighting more informative than the fractional area. In some cases, both tags may be used to determine viability and/or pricing of a dynamic product placement, which will be discussed in greater detail below, with respect to FIGS. 6 and 7.

Video segments 114 may also be tagged with metadata describing content of a sensitive nature, according to various embodiments. For example, a video segment may have a content type tag 320, which may indicate the nature of the sensitive content. Examples include, but are not limited to, presentations of violence, profanity, nudity, sex, drug use, criminal activity, bullying, racism, misogyny, misandry, homophobia or other intolerance, cruelty to animals, alcohol use, tobacco use, and the like. In some embodiments, an additional content type 320 may be content consequential to a content rating, which may duplicate the description of content described by other tags, but may restrict it to content specific to the rating given by a governing body or watch group (e.g. MPAA, etc.). In this way, a curating rubric 128 may specify a desired rating, and the content that would need replacing or removal is readily identified.

According to various embodiments, the content types may have further granularity. For example, varying degrees of conventional "swearing" may be indicated, as well as types of commonplace language that parents might deem inappropriate for very young children (e.g. "stupid", potty talk, etc.). As another example, violence may be further broken down into type (e.g. first fight, gun fight, explosions, etc.) and/or how graphic the depiction is (e.g. bloodless, gory, etc.). According to various embodiments, other types of granularity may be introduced in these and other content types listed above, as well as others unmentioned.

It is understood that while the original intent for this aspect of the VC system is to customize video programming to prevent the showing of sensitive content such as the types mentioned above, the system could be used to categorize, identify, and replace content of any type, be it sensitive or otherwise, according to some embodiments.

A content type tag 320 is paired with a content medium tag 322 in some embodiments. A content medium tag 322 indicates the nature of the content described by the content type 320, whether it is visual or if it is heard, or both. A temporal data tag 324 may describe when in the video segment 114 the content begins and how long it lasts. For visual content, a geometric data tag 326 may be used to describe where it is located within the camera frame, and how that location evolves over time, similar to the geometric data tag 314 described above for use with a visible product. In some embodiments, the geometric data 326 may specify a silhouette of the sensitive content, while in other embodiments, the geometric data 326 may provide a bounding box that safely contains the content while making efficient use of space.

In addition to metadata tags 112 describing content within a video segment 114 that a viewer may wish to remove, other video segments may have already undergone content replacement, whether during the original creation of the content (e.g. creators recorded delivery of alternate lines without profanity, etc.) or after previous operations of the VC system 100 in response to previous curating rubrics 128 (e.g. storage 110 may have a video segment previously modified by the VC server 102 such that gore had been removed, obscured, or color shifted, etc.). Such content may have a replaced content type tag 328, indicating what was replaced in the video segment. As an option, such a tag may also indicate whether the replacement was sounds, images, or both. Additionally, such segments may also have a content replacement source tag 330, indicating where the replacement came from (e.g. original creators/editors/cast, subsequent human generation, automated generation, VC server, etc.). The use of these tags to curate a sequence of video segments according to the content contained within will be discussed in greater detail with respect to FIGS. 8 and 9, below.

Video segments 144 may also be tagged with metadata 112 describing one or more moods likely to be experienced by a viewer of the segment. As will be discussed in greater detail below, in the context of the present description and the claims that follow, a mood is a vector quantity having an emotion type, which can be thought of as the direction, and an emotional intensity, which may be thought of as the magnitude. As shown, these two quantifies may be attached to a video segment as the emotion type tag 332, and the emotional intensity associated with the emotion type 334. The use of these tags to create a curated sequence 140 will be discussed in greater detail below, in the context of FIGS. 10ab and 11.

Video segments 114 may also be tagged with metadata 112 describing the narrative content, according to various embodiments. In some embodiments, a user 120 may specify in a curating rubric 128 that certain narrative modifications are desired. Exemplary narrative tags include, but are not limited to, plot line tag 336 indicating plot lines shown or affected by a video segment, and character tags 228 indicating characters present in the video segment. In some embodiments, these tags may also indicate that certain plot lines and/or characters have been removed from the video segment.

Another narrative tag may be the fungibility tag 340, which may indicate that the video segment is not entirely critical to the narrative, and may further indicate what elements of the video segment are critical to the narrative. For example, a video segment that is an establishing shot may have a fungibility tag 340 indicating the location, time of day, season of the year, and time period depicted. In some embodiments, the metadata left by the recording device (e.g. GPS, time, settings, etc.) may be utilized in conjunction with a fungibility tag 340.

Another narrative tag that may be used is the chronology tag 342, which may indicate a video segments location within one or more narrative chronologies. For example, a chronology tag 342 may indicate where the video segment exists in a timeline that spans multiple movies that depict various segments of the timeline in different orders, such as the Marvel Cinematic Universe. The use of these narrative tags to create a curated sequence 140 will be discussed in greater detail with respect to FIG. 12, below.

In some embodiments, video segments may be tagged to indicate the degree to which they may be modified. In some instances, a content creator may designate video sequences or video segments that may not be modified in some or any way. For example, a director may allow viewers to modify aspects of their movie, but may require that a crucial scene that is at the heart of the story they wish to tell be unmodified. As another example, the creator of a video program dealing with difficult material or historical atrocities may restrict users from removing certain content that may trivialize or lessen the impact of the material.

As shown, in some embodiments, a video track 300 of a video segment 114 may have a watermark 344 applied. As an option, the watermark 344 may be unnoticeable to a human viewer, but detectable by other means. The watermark 344 may be of a nature that survives a change of codec, degree of compression, and/or introduction of noise, as is known in the art. Some embodiments of the VC system 100 may be configured to apply a watermark 344 to one or more video segments 114 in a curated sequence 140 before providing the curated sequence 140 to a viewer 126. The watermark 344 may be designed to be unique and facilitate the identification of the recipient of the curated sequence 140. In some embodiments, the watermark 344 may contain identifying information about the recipient (e.g. name, user name, IP address, etc.). In other embodiments, the watermark 344 may comprise an index that correlates with identifying information stored elsewhere.

The VC system 100, which facilitates the creation of curated sequences of video, may be advantageous in curtailing piracy, or unauthorized copying and distribution of content. Various embodiments of the VC system 100 may apply a watermark 344 unique to a viewer to one or more video segments 114 within the sequence 140. In some embodiments, the choice of segments to which the watermark is applied may be random, to inhibit efforts to remove the identifying information. In other embodiments, the watermark 344 may be applied to video segments 114 that were already being replaced according to a curating rubric 128, to reduce the computational load. In the non-limiting example shown in FIG. 3, the watermark 344 has been applied to the video track 300. In other embodiments, the audio 302 or scoring track 304 may be watermarked instead of, or in addition to, the video track 300, using any of the steganographic methods known in the art.

Figure 4A:
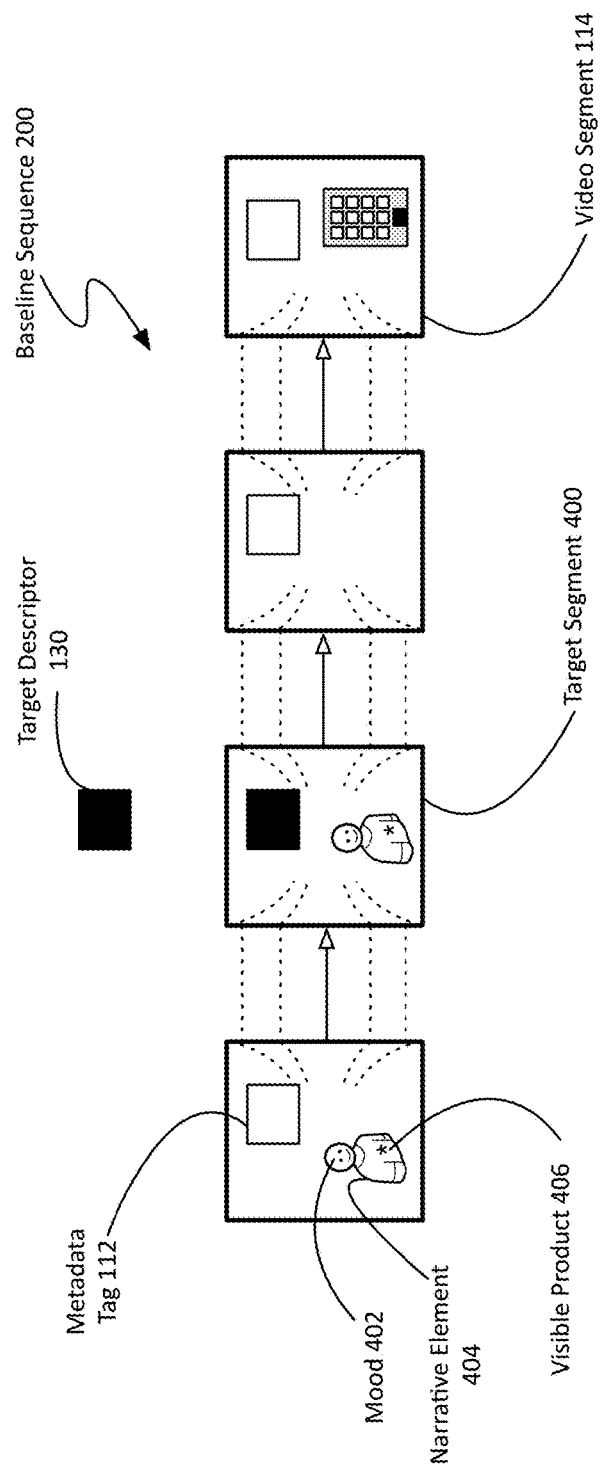
FIGS. 4a-c are schematic views of a non-limiting example of a process for creating a curated sequence of video segments.
Figure 4B:
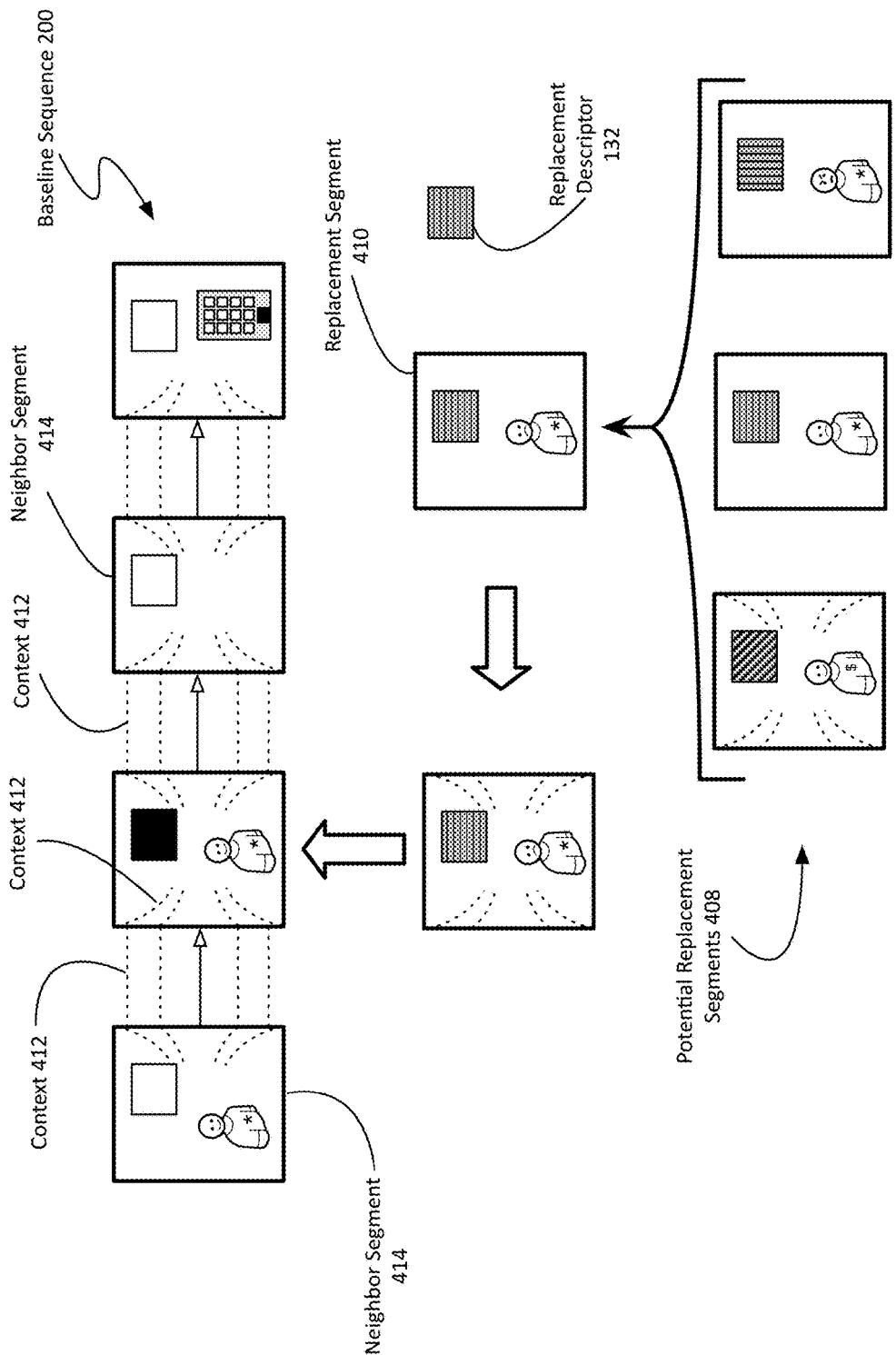
Figure 4C:
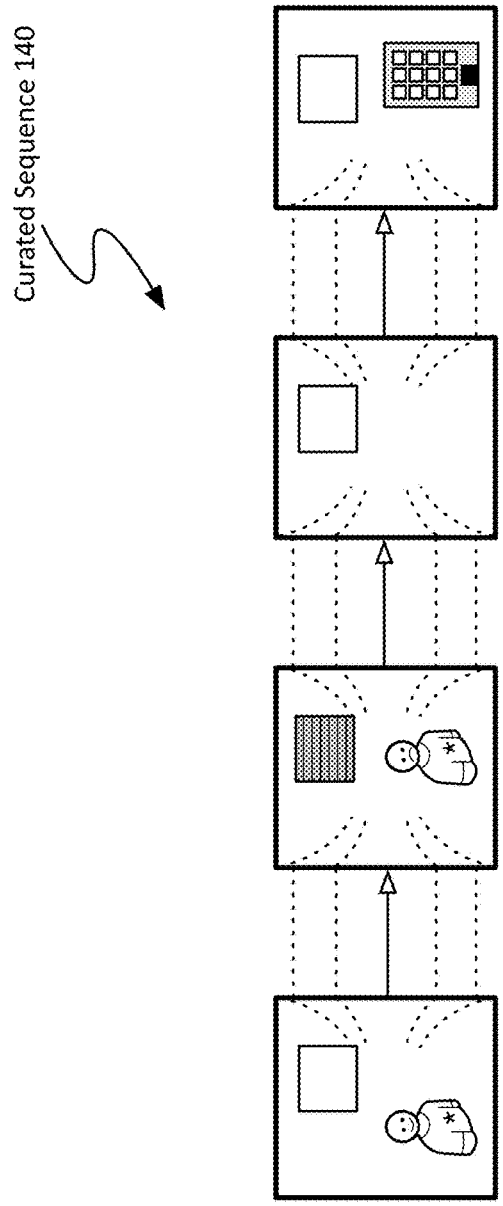

FIGS. 4a-c show a schematic view of a non-limiting example of a process for creating a curated sequence of video segments. FIG. 4a shows a baseline sequence 200 made up of four video segments 114, each segment 114 having metadata tags 112. As shown, the video segments 114 making up the baseline sequence 200 may contain content having attributes such as a mood 402 (e.g. mildly happy, etc.), narrative elements 404 (e.g. a character, a location, etc.), visible products 406 (e.g. the asterisk-branded shirt, etc.), or any other of the content and attributes contemplated herein. These attributes may be described by one or more metadata tags 112, as discussed above with respect to FIG. 3.

A curating rubric 128 (not shown in FIG. 4a) is obtained from a user 122. The target descriptor 130 of the rubric 128 is shown in FIG. 4a. For simplicity, variations in the metadata tags are depicted by fills and patterns in the figures. As shown, the target descriptor 130 matches the metadata 112 for the second video segment of the baseline sequence 200. This match means that segment is a target segment 400. In the context of the present description and the claims that follow, a target segment 400 is a video segment 114 whose metadata matches, or is associated with, some or all of the target descriptor 130 of a curating rubric 128. In some embodiments, the target descriptor 130 may comprise one or more exemplary metadata tags, and a target segment 400 may be any segment in the baseline sequence 200 that is a match. In other embodiments, the target descriptor 130 may comprise exemplary metadata tags, as well as metadata categories and/or ranges, and a target segment 400 may be any segment in the baseline sequence 200 whose metadata matches, is described by, or can be grouped within, the criteria of the target descriptor 130. For example, in one embodiment, a target descriptor 130 may include tags for every form of substance abuse, while in another embodiment the same targeting may be accomplished by a target descriptor that indicates "all substance abuse".

In the non-limiting example shown in FIG. 4abc, a single target segment 400 is shown. It should be understood that a curating rubric 128 may comprise a target descriptor 130 that yields multiple target segments 400. Depending on the curating rubric 128, some or all of the identified target segments 400 may be processed for possible replacement. In one example, a rubric 128 created to remove all profanity from a movie may result in many target segments 400, each of which is replaced with an acceptable segment. As another example, a rubric 128 created to modify the mood of a film to be less scary may result in many target segments 400, but the VC system 100 may stop replacing segments after a mood modification has been achieved that satisfies the rubric 128. In other words, in some embodiments, the VC system 100 may achieve the desired level of curating before all target segments 400 have been replaced.

Once a target segment 400 has been selected, one or more potential replacement segments 408 are identified. In the context of the present description and the claims that follow, a potential replacement segment 408 is a video segment that has been previously determined to be related to another video segment in such a way that, in at least one circumstance, it could replace the video segment. One example is additional takes of a particular shot. Another example is an alternate editing of a scene that was put together previously, but not used. Still another example is a video segment that is fungible in nature and matches one or more fungibility criteria of a target segment (e.g. target segment 400 is tagged to indicate it is fungible, and to indicated it is an establishing shot of the New York City skyline, in 2010, at night). As previously discussed, in some embodiments, video segments 114 may be tagged with a reference tag 306 that points to related video segments (e.g. additional takes, alternate edits, etc.). In other embodiments, such as embodiments where reference tags 306 may not be used or may not be continuously updated, the selection of one or more potential replacement segments 408 may entail searching the plurality of video segments associated with the same show for metadata compatible with the target segment 400.

Once the at least one potential replacement segment 408 has been identified, a replacement segment 410 is chosen by the system 100. In the context of the present description and the claims that follow, a replacement segment 410 is a video segment that best matches the replacement descriptor 132 of the rubric 128 that is associated with the target descriptor 300. In some cases, a threshold may be specified, indicating the lowest degree of matching that is still acceptable. As a specific example, a rubric 128 may be created to generate a curated version of a movie that does not contain any hard profanity, but may specify that the replacement content must at least be alternate dialog from at least an imitator of the original actor (i.e. simply beeping the profanity is not acceptable).

As shown in FIG. 4b, the replacement descriptor 132 with the horizontal lines matches a tag 112 of one of the potential replacement segments 408. In this non-limiting example, the curating rubric 128 was defined to create a curated sequence 140 that is not a cheerful as the baseline sequence 200. As shown, the replacement segment 410 that was selected shows the character frowning instead of the smiling, as they were in the target segment 400.

Sometimes a replacement segment 410 may not exist. In some embodiments, and in some cases, it may be possible for the VC system 100 to automatically generate it. Examples where such an automatic generation may be used include, but are not limited to, product placement and automated content censoring, both of which will be discussed in greater detail, below.

According to various embodiments, before a target segment 400 may be switched with a replacement segment 410, a context 412 is determined for the target segment 400 and the replacement segment 410 is modified to substantially match the determined context 412. With respect to the present description and the claims that follow, a context 412 is any attribute that joins a target segment to the rest of the sequence that needs to be replicated in the replacement segment so that it may be similarly joined. Context may be determined by an examination of the target segment, in addition to neighbor segments 414 that are sequentially proximate to the target segment (e.g. immediately precede and/or follow the target segment, etc.).

One example of context is a visual transition linking a target segment 400 to the neighboring segments 414. Another example is sound, such as a sound effects track or a soundtrack that was not applied to the replacement segment 410 (e.g. an alternate take that wasn't scored, etc.). Other examples of context 412 may include the results of post-processing, such as color grading, that may not have been performed on the replacement segment 410. Post processing is sometimes performed after the editing process, and may not be applied to all of the captured footage.

In some embodiments, some or all elements of context 412 for a target segment 400 may be indicated within the metadata 112. For example, during the editing process, transitions and other edits may be documented and attached to video segments as metadata, either by a human (e.g. the editor, etc.) or a machine (e.g. part of a non-linear video editing program, etc.). As another example, information regarding color grading or color corrections that were performed on video segments may be documented as metadata tags.

In some embodiments, the VC system 100 may look to the metadata 112 of a target segment 400 to determine the context, while in others the context may be determined programmatically. For example, in some embodiments, the plurality of video segments 114 associated with a show may include segments making up the baseline sequence 200, unused alternate takes, and the footage ultimately used in the baseline sequence 200 before any alterations were performed. Using machine vision, a comparison with the segments making up the baseline sequence 200 with the same segments in their original form may yield a set of delta sequences, describing the difference between the raw footage and the baseline sequence 200. According to various embodiments, delta sequences may be derived by performing various operations involving the segments making up the baseline sequence and their raw components. These operations include, but are not limited to, chromatic subtraction, luminance subtraction, exposure subtraction, audio waveform decomposition and subtraction, and the like. In some embodiments, delta sequences may be generated by performing operations on other delta sequences, said operations including but not limited to the application of edge finding algorithms.

In some embodiments, context may extend to continuity of content. For example, in one embodiment, context may extend to the characters (e.g. clothing, hair style, makeup, voice, etc.) and/or setting (e.g. objects visible in scene, lighting, etc.). As a specific example, a replacement segment 410 may be found to have all of the desired traits, but is an alternate take that shows a character in the background that, in the baseline sequence, had been previously killed off. The context determined for the target segment may include the fact that a character is no longer alive. Modifying the replacement segment to substantially match the context of the target segment may include removing the dead character, or obscuring the character (e.g. modifying their appearance, swapping their face for an extra, overlying another person or object, etc.). Other examples of continuity context include, but are not limited to, clothing, makeup and other features, hair, and the like.

After determining the context 412 of the target segment 400, the replacement segment 410 is modified to substantially match the context 412. As previously mentioned, in some embodiments one or more neighbor segments 414 may also need to be modified (e.g. opening or closing part of a transition, etc.). The modifications to be performed on the segment(s) to substantially match the context include modifications known in the art, applied programmatically using parameters ascertained when determining the context 412.

In some embodiments, the modification of a replacement segment 410 to substantially match the determined context 412 may also comprise modifying one or more neighboring segments 414. For example, if a neighbor segment 414 fades into the target segment 400, if some of the fade is contained in the neighbor segment 414 and the replacement 410 differs from the target 400 enough (e.g. different lighting, etc.), the neighbor segment 414 may need to be modified as well, to recreate the fade transition into segment in question.

In the context of the present description and the claims that follow, a context is "substantially matched" when the modified replacement segment 410 blends with the neighbor segment(s) 414 and/or the target segment 400 in one or more aspects to a degree that is within a match threshold. These aspects include, but are not limited to, color temperature, average brightness, sound volume, elements of content continuity, segment transitions, image stabilization, frame rate, audio waveform, and the like. The degree of matching may be determined on a full frame basis, or on the basis of frame segments, or on a pixel-by-pixel basis.

In some embodiments, a match threshold may be a percentage. In one embodiment, a match threshold may be 98%. In other embodiments, match thresholds may be 95%, 90%, 80%, or 75%. As an option, a match threshold may be defined for each contextual aspect considered. In other embodiments, match thresholds may be defined subjectively, and may be based upon the taste of the user who defined the curating rubric 128. In some embodiments, the thresholds may be determined by providing a user with a number of exemplary context matches, asking whether or not they are noticeable enough to distract from the viewing experience.

Conventional methods of matching context for the unobtrusive replacement of one video segment with another require the subjective judgment of a human editor, a time-consuming procedure that relies on the experience and instinct of a film editor. Furthermore, these conventional methods also require examination of all the content being modified, a task that is all part of a day's work for an editor but would be self-defeating for an individual interested in viewing the resulting sequence. It would be hard to enjoy watching a curated sequence 200 after viewing and approving all of the modifications beforehand, one at a time. Advantageous over conventional editing methods, determining a user's preferences for context matching using exemplary video sequences from other shows or sequences produced specifically for such benchmarking, or simply using predefined thresholds for all users, allows for the creation of a curated sequence 200 that satisfies a user without spoiling the experience.

As shown in FIG. 4b, after the replacement segment 410 has been modified to substantially match the context 412, it is exchanged for the target segment 400 within the baseline sequence 200 to form a curated sequence 140 of video segments. See FIG. 4c. The curated sequence 140 is then prepared for presentation to one or more viewers 126, who may include the user 122. According to various embodiments, this preparation may comprise encoding the sequence to facilitate streaming and/or displaying on a viewer device 124. As an option, the encoding may be performed only on the parts of the curated sequence 140 that are not already encoded. In some embodiments, the encoding may be optimized for a particular type of viewer device 124.

Figure 5:
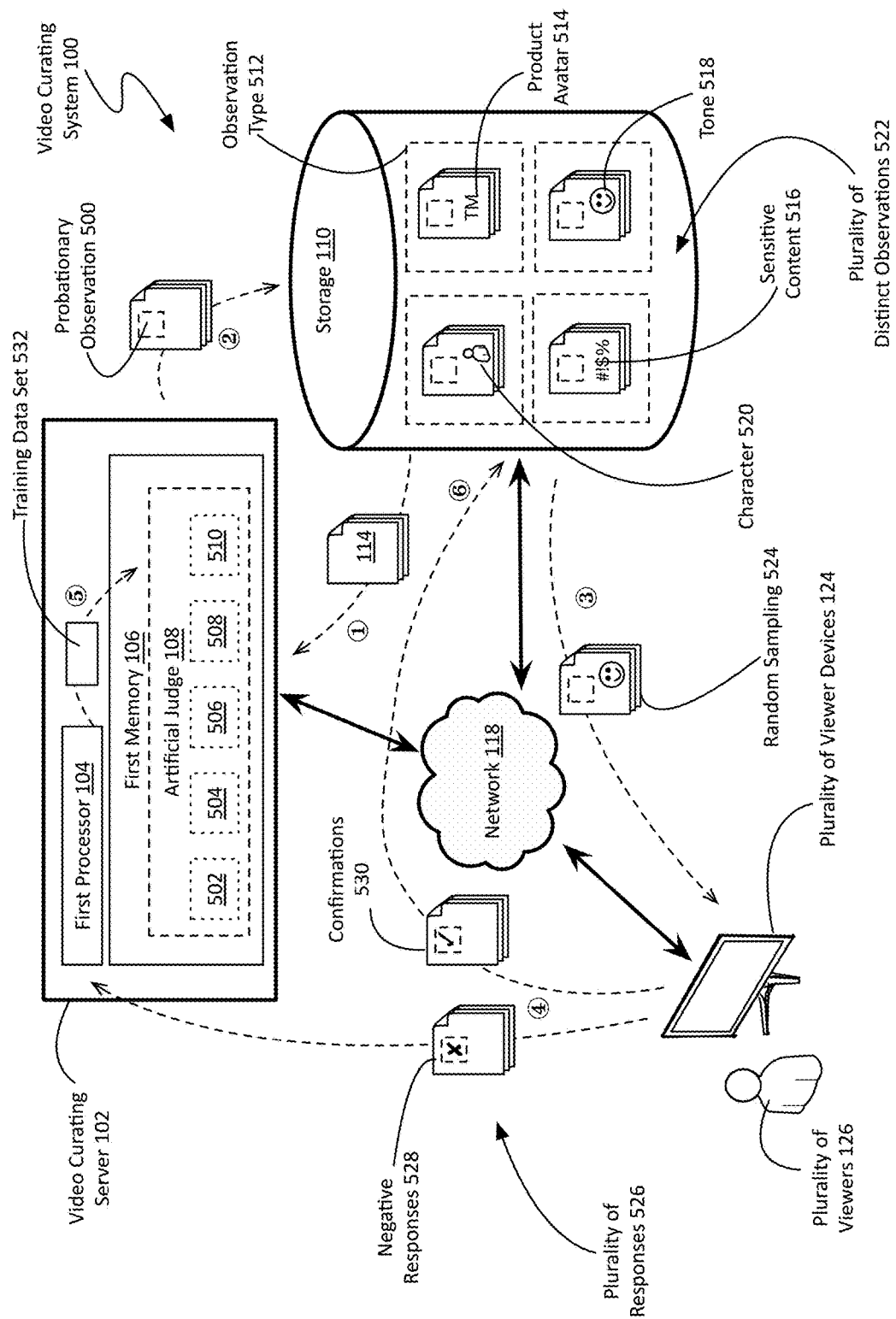
FIG. 5 is a schematic view of a process for automatically generating metadata tags for video segments.

FIG. 5 shows a schematic view of a process for automatically generating metadata tags for video segments, according to various embodiments. Only a fraction of the material captured in the production of a show is used in the final, baseline sequence 200. The availability of the unused material allows the VC system 100 to generate a curated sequence 140 tailored to the desires of a user 122 as expressed in a curating rubric 128. However, to accomplish this, the video segments and other materials associated with the show need to be tagged with metadata tags 112 that describe their various attributes that may be a basis for curation. The conventional method of applying metadata tags to media manually by presenting it to one or more human evaluators who manually apply tags is tedious, expensive, and too slow to feasibly tag all of the video sequences associated with a show, which could be tens or even hundreds of times more material than was ultimately used in the baseline sequence.

Advantageous over conventional tagging methods, various embodiments of the VC system 100, including the non-limiting example shown in FIG. 5, can automatically evaluate media and verify those evaluations to quickly provide an accurately tagged library of media content. It should be noted that although the automatic tagging process discussed below is described in the context of tagging video segments, it may be adapted for use on audio tracks such as dialog and backing music as well.

First, one or more untagged or partially tagged video segments 114 are provided to the VC server 102 for evaluation. See circle 1. As shown these segments may be obtained from the storage 110, or may be obtained from other sources, such as a third party server 136 (not shown in FIG. 5). While this process may be used to tag video segments 114 that have never been tagged before, it may also be used to supplement, or even correct, metadata tags 112 on previously tagged video segments 114. For example, some segments may have metadata tags applied during the editing process (e.g. describing color corrections, chronology, related segments, etc.) while other segments, such as segments that were discarded during the editing process, may not have any tags.

Next, the VC server examines the provided video segments using an artificial judge 108 to generate one or more probationary observations 500. See circle 2. In the context of the present description and the claims that follow, an artificial judge 108 is a collection of technologies designed to consider different visual and/or auditory aspects of a piece of media. The non-limiting example shown in FIG. 5 is a software-based implementation stored in a first memory 106 of the VC server 102. According to various embodiments, the artificial judge 108 may be implemented in software, or in software utilizing, at least in part, specialized hardware optimized for adaptive processing.

As shown in the non-limiting example depicted in FIG. 5, the artificial judge 108 may employ a number of technologies, including but not limited to natural language processing 502 (e.g. optical character recognition, written language parsing, voice recognition, spoken language parsing, etc.), facial recognition 504 (e.g. face detection, identity matching, gaze tracking, etc.), chromatic decomposition 506 (e.g. color space analysis, color histograms, etc.), machine vision 508 (e.g. emotion recognition using facial expressions and/or body language, object identification, measurement and/or model construction using photogrammetry, logo/branding detection, etc.), and tonal decomposition 510 (e.g. music/sound fingerprinting, spectral analysis, identification through voice recognition, etc.). It should be understood that in the future, as technologies for parsing, evaluating, and even understanding visual and audio media continue to develop, they may be utilized by the VC system 100 for generating probationary observations 500.

According to various embodiments, the artificial judge 108 may make one or more probationary observations 500 of at least one observation type 512. Exemplary observation types 512 include product avatars 514 (e.g. logos, brands, mottos, jingles, actual products, product names, etc.), sensitive content 516 (e.g. spoken sensitive content, visual sensitive content, etc.), tone 518 (e.g. mood, emotion, intensity, etc.), and characters 520 (e.g. role, voice, actor, etc.). Other observation types may include locations (e.g. detection of landmarks, streets, etc.), music, contexts (e.g. transitions, etc.), and the like. The resulting probationary observations 500 may be attached to the associated video segments 114 like metadata tags 112, with an indication that they have not been verified and should not be relied upon for generation of curated sequences 140. In some embodiments, aspects of the artificial judge may be deemed universally reliable, and the tags generated by such aspects may be applied as metadata tags 112, skipping the probationary period altogether.

Next, the probationary observations may be validated. In some embodiments, the segments having probationary observations 500 may be used in curated sequences 140, but may prompt the user and/or viewer that one or more probationary observations 500 have been relied upon in creating the curated sequence 140. As an option, the viewer(s) may be asked to rate the curated sequence 140 after it has been displayed. Said rating may be used to modify a confidence level associated with the probationary observations relied upon in making that sequence. If the confidence level rises above a predefined level, the observation may be made into a metadata tag 112, and if the confidence level drops below a predefined level, that probationary tag 500 may be modified or even removed. In this way, the probationary observations 500 generated by the artificial judge 108 may be validated by humans. However, such a method of validation is slow and may not necessarily improve the artificial judge.

Some embodiments, including the non-limiting example shown in FIG. 5, may take a statistical approach to validating the probationary observations 500. As shown, a random sampling 524 of video segments with probationary observations 500 may be presented to a plurality of viewers 126 through their associated viewer devices 124 for confirmation. See circle 3. In some embodiments, the probationary observations 500 may be validated by observation type, meaning observations of a type all stand or fall together, independent of the confirmation of other observation types. In other embodiments, the probationary observations 500 may be validated by the technology used by the artificial judge 108 to generate the observation. For example, all observations involving the detection and parsing of written text may be grouped, meaning detection of written profanity and recognition of product names would stand or fall as a group. Such an arrangement may be advantageous for unproven technologies added to the artificial judge 108.

In some embodiments, the process of validating probationary observations 500 may be triggered based upon the number of unverified segments in storage 110. For example, validation may be delayed until a large enough body of observations has been generated to indicate with some degree of confidence the accuracy of an observation type. In other embodiments, validation of probationary observations 500 may be performed on a show by show basis. As stated before, a show 204 is a collection of related video segments, including, but are not limited to, television episodes, television seasons, television series, movies, movie series, sports leagues, events involving a particular sport team, a sporting event, a news cycle, news covering a particular event, and the like. Video segments 114 associated with a show 204 tend to have recurring elements (e.g. actors, dialog style, scenes, products, sensitive content, etc.). The artificial judge 108 may be more successful in evaluating some of these elements than others across different shows. As a specific example, the artificial judge 108 may be relatively accurate in recognizing the mood associated with facial expressions, except for a particular actor whose mannerisms are often misinterpreted. By grouping the validation batches by show, such inconsistencies may be detected and accounted for.

According to various embodiments, the random sampling 524 provided to viewers 126 may be statistically representative and non-exclusionary of a plurality of distinct observations 522, meaning the sampling represents every kind of observation (e.g. every different profane word detected, every different brand detected, etc.) made for an observation type (e.g. sensitive content 516, product avatar 514, etc.) with no omissions, and the number of samples being representative to the number of observations of that kind. As an option, a floor may be set, meaning that if there are less than a certain number of instances of a certain kind of observation, all instances are included in the random sampling 524.

As confidence increases in the overall performance of different aspects of the artificial judge 108, the parameters of the random sampling 524 (e.g. size, floor, etc.) may be adjusted for efficiency.

In some embodiments, each segment of the random sampling 524 may be shown to a viewer for confirmation. In other embodiments, each segment may be shown to multiple viewers 126, or on multiple devices 124, for greater accuracy. As an option, cameras communicatively coupled to a viewer device 124 and local to a viewer 126 may use gaze tracking to determine if they are actually watching the segment for verification.

After a video segment from the random sampling 524 has been presented to a viewer 126, the viewer 126 is allowed to provide feedback, confirming the probationary observation or rejecting it. In some embodiments, a viewer 126 may be incentivized to provide such feedback by offering access to content, which may be baseline sequences 200 and/or curated sequences 140, in return. As an option, such a credit may be held back until their evaluation has been corroborated by one or more other viewers, to incentivize the viewers to take the evaluation seriously. In some embodiments, the size of the reward offered for verification may vary depending upon the needs of the system 100. For example, if there are not enough people willing to confirm probationary observations 500 of very gory violence, the reward may be increased automatically by the VC system 100 until the need is met.

Viewers may be chosen to receive segments from the random sampling 524 based upon information within a viewer profile, to ensure they are evaluating appropriate material. For example, verification of sensitive content observations may be restricted to viewers above a certain age who have indicated their willingness to evaluate such content. As another example, identification of cartoon character's voice may be directed to viewers of the age group likely to be familiar with the cartoon.

After viewing the video segment and being asked if a probationary observation associated with the segment is accurate, the viewer provides a response 526. See circle 4. In some embodiments, the viewer 126 may provide their response through the device 124 on which the segment was displayed (e.g. on-screen prompts, menu, etc.). In other embodiments, a viewer 126 may provide their response through a channel, medium, or device different from that used to display the segment for confirmation. For example, after viewing a segment and probationary observation 500 on their television, a viewer 126 may respond through an app on their mobile device.

As shown, in some embodiments, the responses 526 may simply indicate a confirmation 530 that the probationary observation 500 was accurate or a negative response 528, indicating they disagreed with the probationary observation 500. In some embodiments, a viewer 126 may be able to provide a replacement observation when sending a negative response 528. This replacement observation may be attached to the video segment as a probationary observation and the segment may be placed back into the collection for future verification. In other embodiments, the proposed replacement observation may be provided to the VC server 102, for improving the artificial judge 108.

As shown, the negative responses 528 may be sent to the VC server 102 for evaluation. See circle 5. According to various embodiments, the negative responses 528 may be used to generate a training data set 532 to be applied to the artificial judge 108. In this way, the computational generation of probationary observations 500 may be refined and improved. In some embodiments, such training data may be used to create an instantiation of the artificial judge 108 specific to the associated show. For example, training data 532 generated by negative responses 528 to probationary observations 500 regarding dialog of a character with a peculiar speech pattern, like Yoda in Star Wars, may be restricted to shows where such data is relevant, to avoid degrading the overall performance by addressing the outlier situations.

The group from which the random sampling 524 was taken (e.g. observation type, judge technology, etc.) may be validated as a whole when substantially all of the random sampling 524 has been confirmed. Once the group has been confirmed, all probationary observations associated with the group may be turned into metadata tags 112 appropriate for use in creating a curated sequence 140. See circle 6. In the context of the present description and the claims that follow, substantially all of a random sampling may 100%, 95%, 90%, 80%, or simply a majority of the sampling, according to various embodiments. In other embodiments, substantially all of the random sampling is between 50% and 100% of the sampling.

In some embodiments, viewers 126 may be utilized in verifying probationary observations 500, or even generating probationary observations, without requiring them to submit a response. For example, in implementations where a camera is attached to a viewer device 124 and is able to see the viewer, the artificial judge 108 may gauge viewer reaction to a preliminary observation through their facial expressions, micro expressions, body language, speech, voice patterns, and the like. In some cases, probationary observations 500 for observation types like tone 518 may be generated by evaluating how the viewer reacts to the segment (e.g. laughter, disgust, etc.). In some embodiments, the artificial judge 108 may also be used to determine viewer engagement with the material being presented.

The VC system 100 provides viewers with a number of new ways to enjoy shows. In some cases, that means enjoying customized versions of shows. In other cases, that means having access to shows that are subsidized by product placement integrated into the program rather than advertisement breaks (or at least reduce the length of advertisement breaks).

Figure 6:
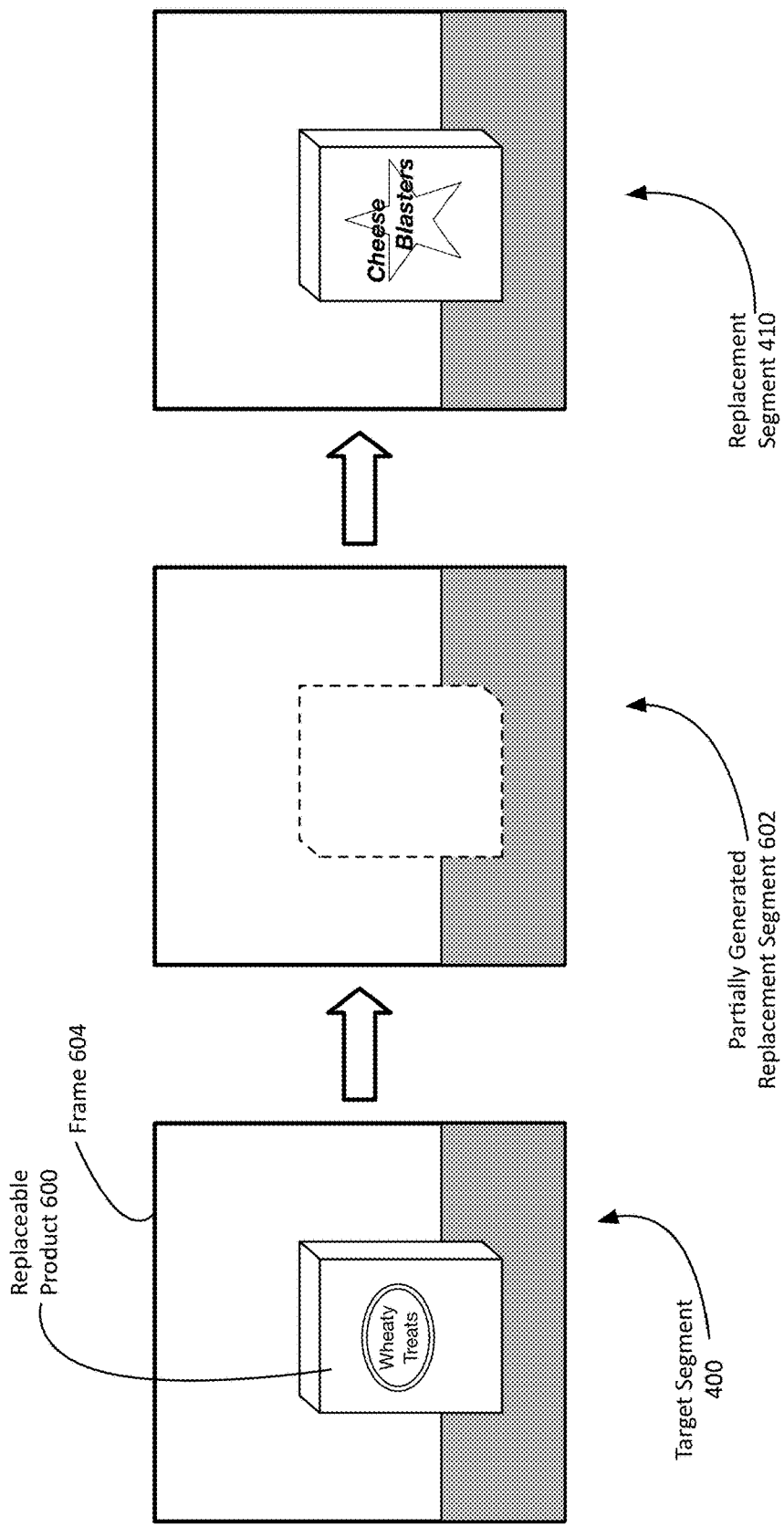
FIG. 6 is a schematic view of the generation of a product placement replacement segment.
Figure 7:
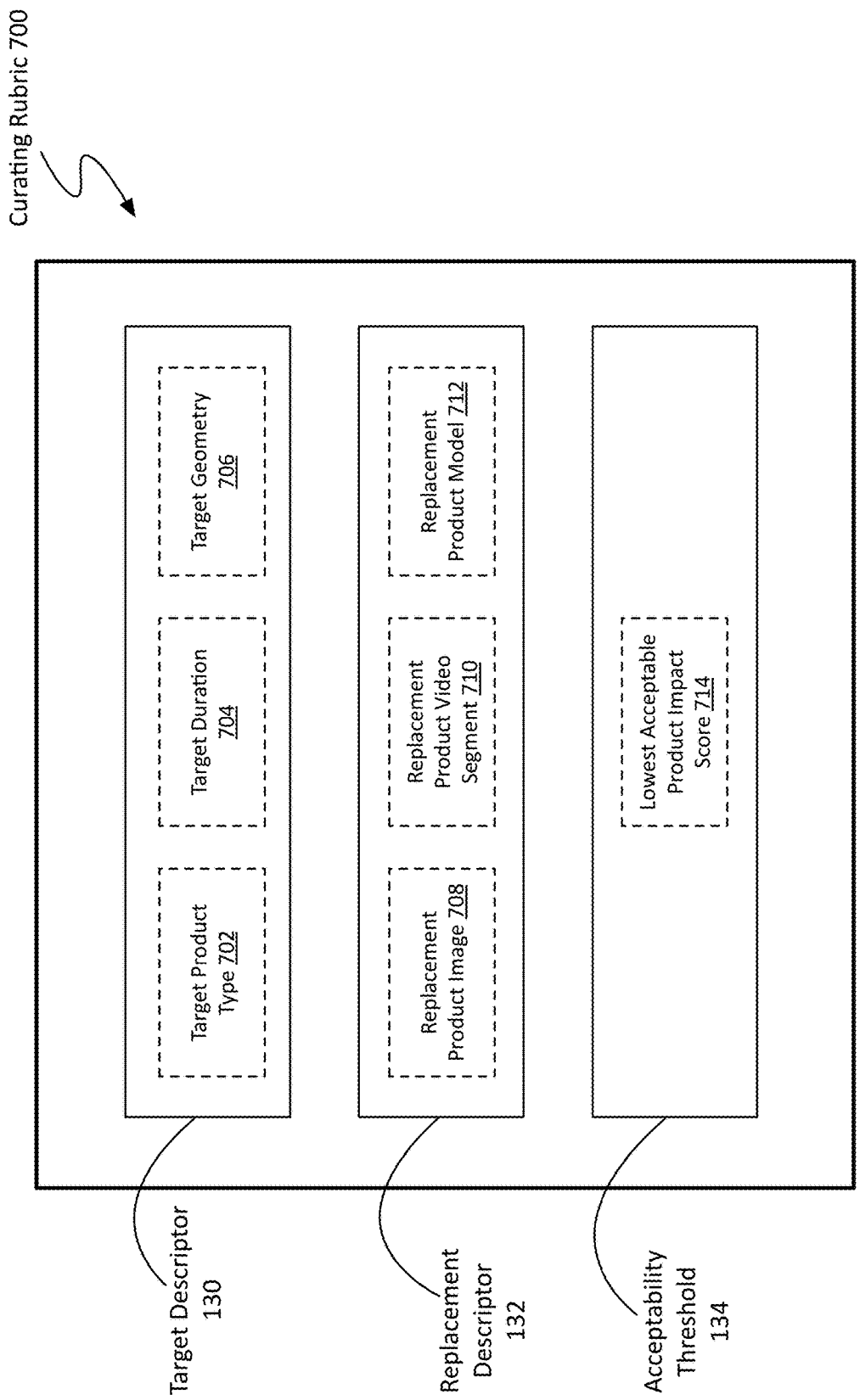
FIG. 7 is a schematic view of a curating rubric for product placement.

FIGS. 6 and 7 show a non-limiting example of how the VC system 100 may be used to dynamically insert product placement into a show. Specifically, FIG. 6 is a schematic view showing the generation of a product placement replacement segment, and FIG. 7 is a schematic view of a curating rubric for product placement.

As previously discussed in the context of FIG. 3, a number of metadata tags 112 may be attached to a video segment 114 that are related to a product, including a product type 310, temporal data 312, geometric data 314, visibility weighting 316, and a fractional area tag 318. According to various embodiments, one or more of these tags may be the basis for the target descriptor 130 of a curating rubric 128 for product placement. See, for example, the curating rubric 700 of FIG. 7, which comprises a target descriptor specifying a target product type 702 (e.g. box of dry snack food, etc.), a target duration 704 (e.g. 15 seconds, etc.), and a target geometry 706 (e.g. evolution of product silhouette, etc.).

In applying the target descriptor 130 of rubric 700, the VC system 100 will determine if any of the video segments of a baseline sequence 200 contain a replaceable product 600. In the context of the present description and the claims that follow, a replaceable product is a product that is visible in a video segment whose replacement is, at least in part, without legal restraint. In some embodiments, if a video segment contains tags 112 describing a product, it may be assumed that the product has been determined to be a replaceable product 600. In other embodiments, a target descriptor 130 containing product placement elements that match one or tags 112 of a video segment may trigger a renewed determination of whether or not there is a legal agreement constraining the replacement or modification of said product. In some embodiments, this is performed by searching a plurality of legal agreements 116 contained in storage 110. In other embodiments, such a determination may be performed by requesting confirmation from a third party server 136.

FIG. 6 shows an exemplary target segment 400, featuring a box of "Wheaty Treats" that is a fictitious brand created for the show, and is without legal constraint for replacement. In some cases, the replaceable product 600 will be a fictitious product. In other cases, the replaceable product 600 may be a real product with a marketing agreement that has lapsed. In still other embodiments, a video segment 114 may be tagged as though it contains a replaceable product, but instead is identifying the timing and geometry of an open space in which a product could be placed. For example, a video segment where characters are talking in a kitchen with an empty countertop may be tagged indicating that a cereal box could be placed in an empty space.

In some embodiments, the target descriptor 130 may further include narrative considerations. For example, a beverage company may not wish to have their product repeatedly portrayed as the drink of choice of a movie's repulsive villain, and a computer company may not wish to have their latest laptop swapped in for the computer that fails in the middle of the protagonist's big presentation. In some embodiments, tags indicating visible products may be limited to segments where the visible product is portrayed in a positive or neutral light. In other embodiments, the nature of the portrayal may be an additional metadata tag, allowing advertisers to use an otherwise negative image to their benefit (e.g. a popular anti-hero protagonist, etc.).

Once a target segment 400 has been selected, a potential replacement segment is identified using the replacement descriptor 132 of the rubric 700. In some cases, the replacement descriptor may simply refer to a previously generated video segment 710 that is a modification of the target segment to include a product being promoted by the creator of the rubric 700. For example, once that product has been inserted, the replacement product video segment 700 with the inserted product may be stored and displayed to a number of viewers without requiring regeneration.

In other embodiments, including the non-limiting example shown in FIG. 7, the replacement descriptor 132 of the rubric 700 may comprise material to be used in creating a replacement product video segment, such as a replacement product image 708 (e.g. logo, picture of the product to superimpose on a flat surface or printed material, etc.) and/or a replacement product model 712 (e.g. a three-dimensional model of the replacement product, etc.).

Identifying the potential replacement segment may also comprise determining if a replacement segment has already been partially generated, meaning the replaceable product has been removed. As shown in the non-limiting example of FIG. 6, the partially generated replacement segment 602 is simply the target segment 400 with the replaceable product 600 removed. This may be computationally advantageous, as a seamless swapping of objects in a three-dimensional scene is often more complicated than cutting out a silhouette and sticking in a replacement. For example, in some cases diffuse reflection may cause a replaceable product to influence the scene beyond its border. A bright red box sitting on a white counter would result in a slightly red hue on the surface around the box (i.e. the light scattered off the red box onto the white counter). Replacing the red box with a green box, without addressing the diffuse reflection, would strike the viewer as odd looking, if not obvious what is wrong. Another example is reflections; a replaceable product may be reflected in other surfaces in the scene. By creating a partially generated replacement product segment 602, these and other matters may be addressed once, facilitating the use of that target segment 400 for more than one product replacement, as will be discussed in greater detail below.

Once a partially generated replacement segment 602 has been generated, it may be stored in the storage 110. As an option, a reference to the partially generated replacement segment 602 may be added as a metadata tag 112 of the target segment 400.

The matching of the context of the target segment may comprise one of retrieving a previously generated replacement segment 410 from the storage 110 and creating a replacement segment 410 using a partially generated replacement segment 602. Furthermore, in some embodiments, the matching of context may further include determining whether the replacement product is compatible with the context of the target segment and its neighbor segments 414. For example, if the baseline sequence 200 is a television episode taking place in 1990, it might be deemed too disruptive to the context to replace a soda popular in 1990 with a soda that wasn't released until 2017.

As previously discussed, some embodiments of the VC system 100 make use of an acceptability threshold 134. For example, in some embodiments, determining whether a product placement acceptability threshold 134 is satisfied may comprise determining if a weighted product impact score associated with the potential replacement segment is greater than a lowest acceptable product impact score. In the context of the present description and the claims that follow, a weighted product impact score is a function of a fractional area 318 of a frame 604, a duration (e.g. duration of product visibility 312, etc.), and a visibility weighting 316. The fractional area 318 and visibility weighting 316 were discussed previously in the context of FIG. 3. A weighted product impact score combines these two metrics in a function particular to a specific product. For example, a poorly visible product that is in frame for a long time might have a similar score as a highly visible product, large in frame, that is visible for a very short period of time. By setting a lowest acceptable product impact score 714, a user 122 may tune the range of way their product is presented to the target audience to achieve maximum effect. According to various embodiments, the weighted product impact score is simply a weighted sum of the elements described above. Those skilled in the art will recognize that other functions may be used, and may be chosen based upon a particular marketing strategy or campaign.

The use of a VC system 100 for product placement is advantageous for the viewer as it provides an additional revenue stream for the content provider, breathing new life into older shows and potentially reducing or even eliminating the number of advertisement interruptions the viewer experiences, or perhaps lowing the subscription fee for a content streaming service. However, this application of the VC system 100 is also advantageous to advertisers and the product producers. The VC system 100 facilitates the creation of curated video sequences. Similar to the targeting of web advertisements based upon browser history, the products inserted into a video stream being shown to a viewer may be targeted to them based upon any of a number of metrics known in the art of targeting advertising. Those skilled in the art will recognize that the VC system 100 makes it possible to present viewers with advertising with the same level of targeting available through the web.

Additionally, the VC system 100 may be incorporated into multi-channel advertising. For example, a viewer who is binge watching an older TV show by streaming it to their laptop from a VC server 102 may be enjoying a seemingly endless series of episodes without fee or commercial break because footage, packaging, and subtle ads related to a new video game are being inserted into subtle ways. When the viewer stops watching to check something on a fan site related to the show, a banner ad selling the game with a discounted pre-order is displayed at the top, because the show streaming and the web browsing were taking place from the same external IP address. Those skilled in the art will recognize that applications of VC systems in advertising extend well beyond this simplistic example.

This flexibility makes the partial generation of replacement segments advantageous. For example, if a video segment in a baseline sequence has a nice shot of a box of "Wheaty Treats", a partially generated segment could be stored in storage 110, and used to show "Cheese Blasters" to a teen viewer and "Gluten-Free Fluff Puffs" to an adult who recently did a web search concerning gluten free snacks.

In some embodiments, a viewer may specify in their profile what, if any, types of product placement they will allow. For example, parents may wish to avoid having their children exposed to subtle marketing campaigns. Additionally, in some embodiments, viewer demographics may be taken into account when determining whether a potential replacement product segment is viable. For example, if it is known that the viewer is a child, a beer may not be swapped out for a soda.

Another exemplary application of the VC system 100 is the generation of curated sequences 140 where specific types of sensitive content has been removed. People have a wide range of tastes and sensitivities, and parents in particular have a wide range of policies regarding what they will and will not allow their children to be exposed to. According to various embodiments, the VC system 100 may be utilized to generate a curated sequence 140 bereft of content the user 122 deemed inappropriate.

Figure 8:
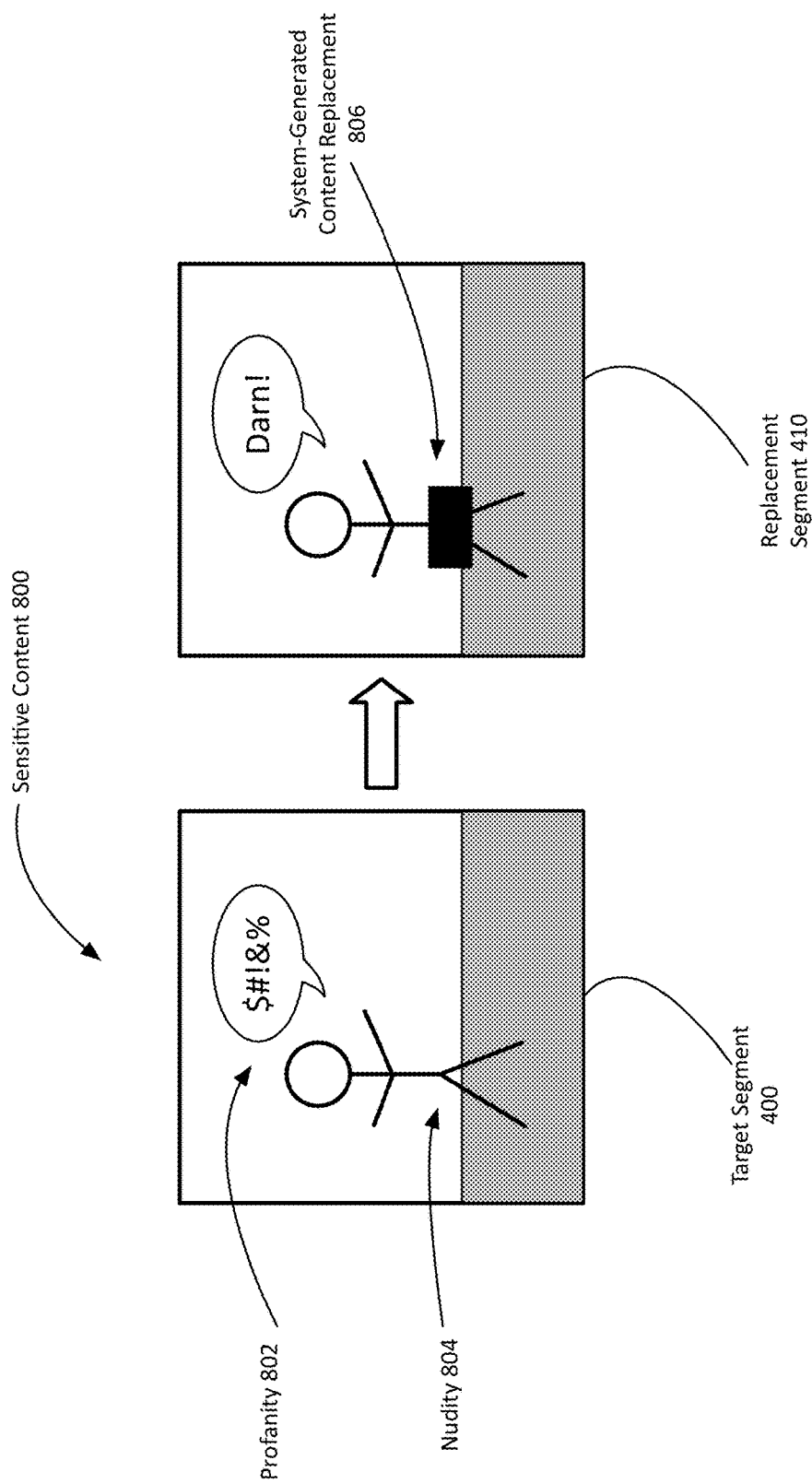
FIG. 8 is a schematic view of the generation of a replacement segment having reduced sensitive content.
Figure 9:
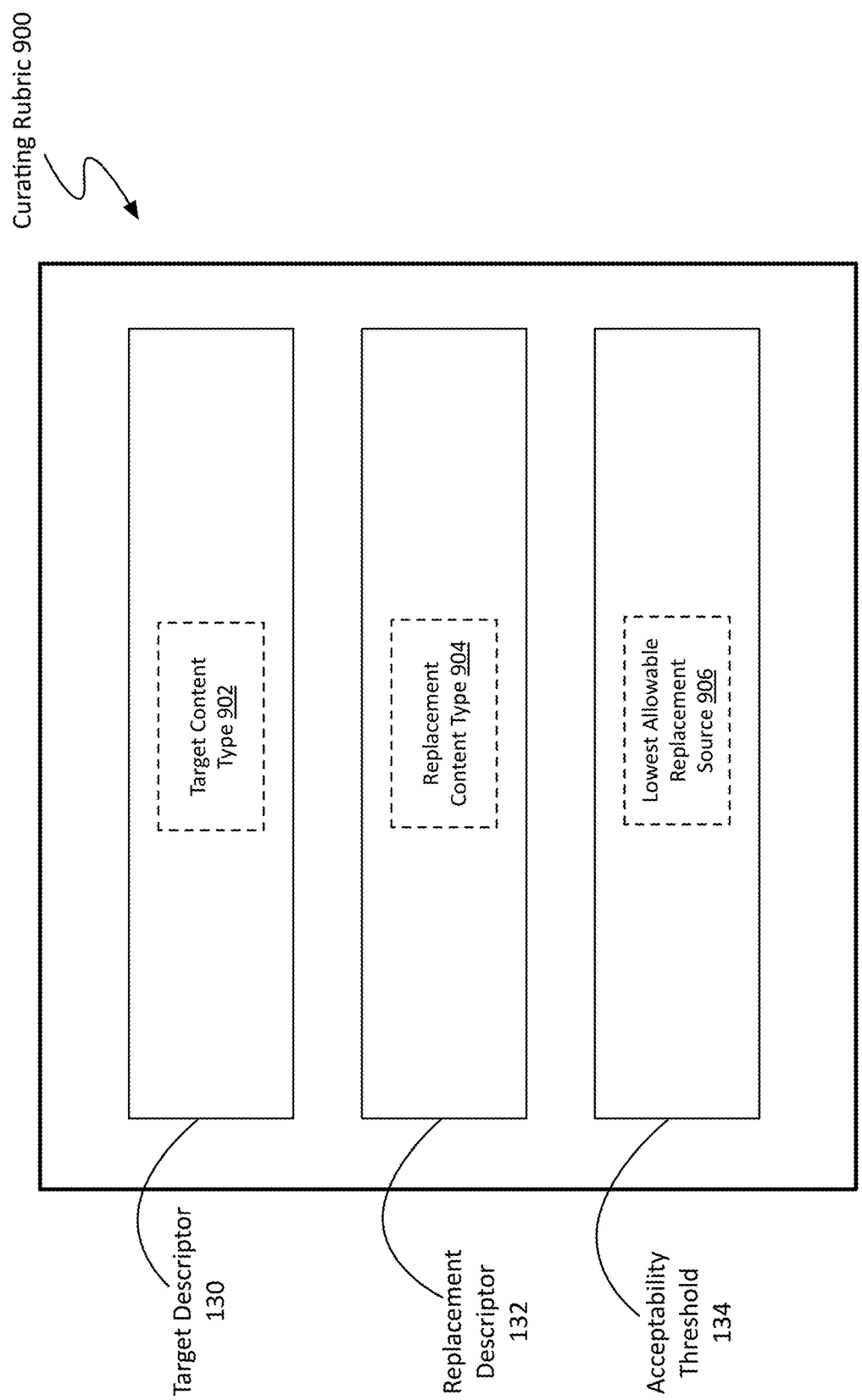
FIG. 9 is a schematic view of a curating rubric for reduction of sensitive content.

FIGS. 8 and 9 show a non-limiting example of how the VC system 100 may be used to remove or obfuscate sensitive material from a show. Specifically, FIG. 8 schematic view of the generation of a replacement segment having reduced sensitive content, and FIG. 9 is a schematic view of a curating rubric for reduction of sensitive content. As previously discussed in the context of FIG. 3, a number of metadata tags 112 may be attached to a video segment 114 that are related to sensitive content, including a content type 320, a content medium 322, a temporal data 324, and a geometric data 326.

According to various embodiments, one or more of these tags may be the basis for the target descriptor 130 of a curating rubric 128 addressing sensitive content 800. See, for example, the curating rubric 800 of FIG. 8, which comprises a target descriptor specifying a target content type 902 (e.g. profanity 802, nudity 804, etc.). Sometimes all that is needed is a target content type 902, but in some cases a user 122 may wish to differentiate between content that is seen and content that is heard, a distinction that carries more weight with some types of content (e.g. seeing someone get shot vs. hearing someone get shot, etc.) than others (e.g. reading a profane word vs. hearing a profane word, etc.).

According to various embodiments, the replacement descriptor 132 of rubric 900 may simply mirror the target descriptor 130, since the type of content being targeted is usually the type of content that has been replaced in a potential replacement segment. The selection of a replacement segment from the potential replacement segments may comprise searching for segments having metadata indicating a replaced content type 328 matching the target content type 902. For example, if a rubric 900 specifies a target content type 902 of frontal nudity, the replacement segment will have a replaced content type 328 tag of frontal nudity.

Various embodiments of the VC system 100 capable of reducing sensitive content in a curated sequence allow a user to specify a lowest allowable replacement source 906. In some embodiments, the lowest allowable replacement source 906 may be specified in the replacement descriptor 132. In other embodiments, including the non-limiting example in FIG. 9, the acceptability threshold 134 may specify the lowest allowable replacement source 906.

As discussed within the context of FIG. 3, a content replacement source tag 330 specifies where the replacement segment came from, or at least where the portion of the segment with reduced or removed sensitive content came from. As previously discussed, these sources can range from the content creator (e.g. alternate scenes filmed with softened dialog or visuals, etc.), alternate sound tracks from original actors (e.g. alternate dialog recorded separate from filming to dub over, etc.), alternate imitation sound track (e.g. impersonator delivering softened lines, etc.), and system generated content (e.g. programmatically removed or obfuscated content, computer generated images and sounds, etc.). See, for example, the system-generated content 806 obscuring the frontal nudity in the replacement segment 410. In some embodiments, multiple sources may be employed. For example, in FIG. 8, the replacement segment 410 comprises alternate audio from the original stick figure (i.e. "Darn!") as well as system-generated content 806 blocking the stick figures frontal nudity 804.

Specifying a lowest allowable replacement source 906 allows a user to indicate at what point they are not interested in a curated sequence 140 with reduced sensitive content. For example, a user 122 may feel that unless the alternate dialog is recorded from the original actors, the replacement is too distracting, and thus may set the lowest allowable replacement source 906 to specify that preference. In some embodiments, a similar preference may be specified in rubric 900, indicating the maximum allowed reduction in running time. For example, a user 122 may specify that if the desired curation results in a movie that is more than 30 minutes shorter, it is not worth it.

This method of generating content with reduced sensitive material is advantageous over conventional methods. Conventional methods rely on human tagging and the creation of multiple versions of the same sequence. The VC system, on the other hand, allows for greater granularity (e.g. specific words, specific acts, etc.) while also automating the process of tagging the media and assembling the sequences.

In some embodiments, the VC system 100 may be used to remove sensitive content from a video sequence. In other embodiments, a user 122 may construct a curating rubric 128 wherein some sensitive content is identified, and presented to the viewer as an opportunity to learn, or for parents to discuss the material with their children. For example, specified types of sensitive content may be accompanied by an indicator within the video segment commenting on the nature of the content. The indicator may be visual, auditory, or both. Furthermore, the sensitive content may be reduced or removed, in addition to the presentation of the indicator. This method of addressing the presentation of sensitive content is advantageous in that, rather than simply shielding viewers from such content, an opportunity is created for viewer education, and may help parents discuss difficult topics with their children.

According to various embodiments, the indicator may provide an explanation of why the content may be considered objectionable, or may simply provide a prompt or conversation starter, facilitating a conversation between parents and children. In some embodiments, the viewer may have the option of pausing the presentation of the curated sequence 140 to view a more detailed explanation. Additionally, in some embodiments, the information presented may be tailored to the viewer. For example, the explanation given to a young viewer may have less detail than one presented to a teenager. As an option, a parent may specify the level of detail presented to a child on the topics they specify should be indicated, according to some embodiments. Additionally, this method of indicators and explanations may be used to highlight laudable content, in addition to or instead of focusing on objectionable material.

Yet another exemplary application of the VC system 100 is the generation of curated sequences 140 tailored to fit a particular mood. Subtle details can affect the overall emotional response a viewer has to a video segment, whether it be a facial expression, the tone with which dialog is spoken, or the music playing in the background. Tiny variations between multiple takes shot of the same scene may provide subtle differences in tone. Of course, entire scenes can be recut or reshot to convey a different tone as well. According to various embodiments, the VC system 100 may be utilized to generate a curated sequence 140 having an overall emotional impact that is different than that of the baseline sequence 200.

Figure 10A:
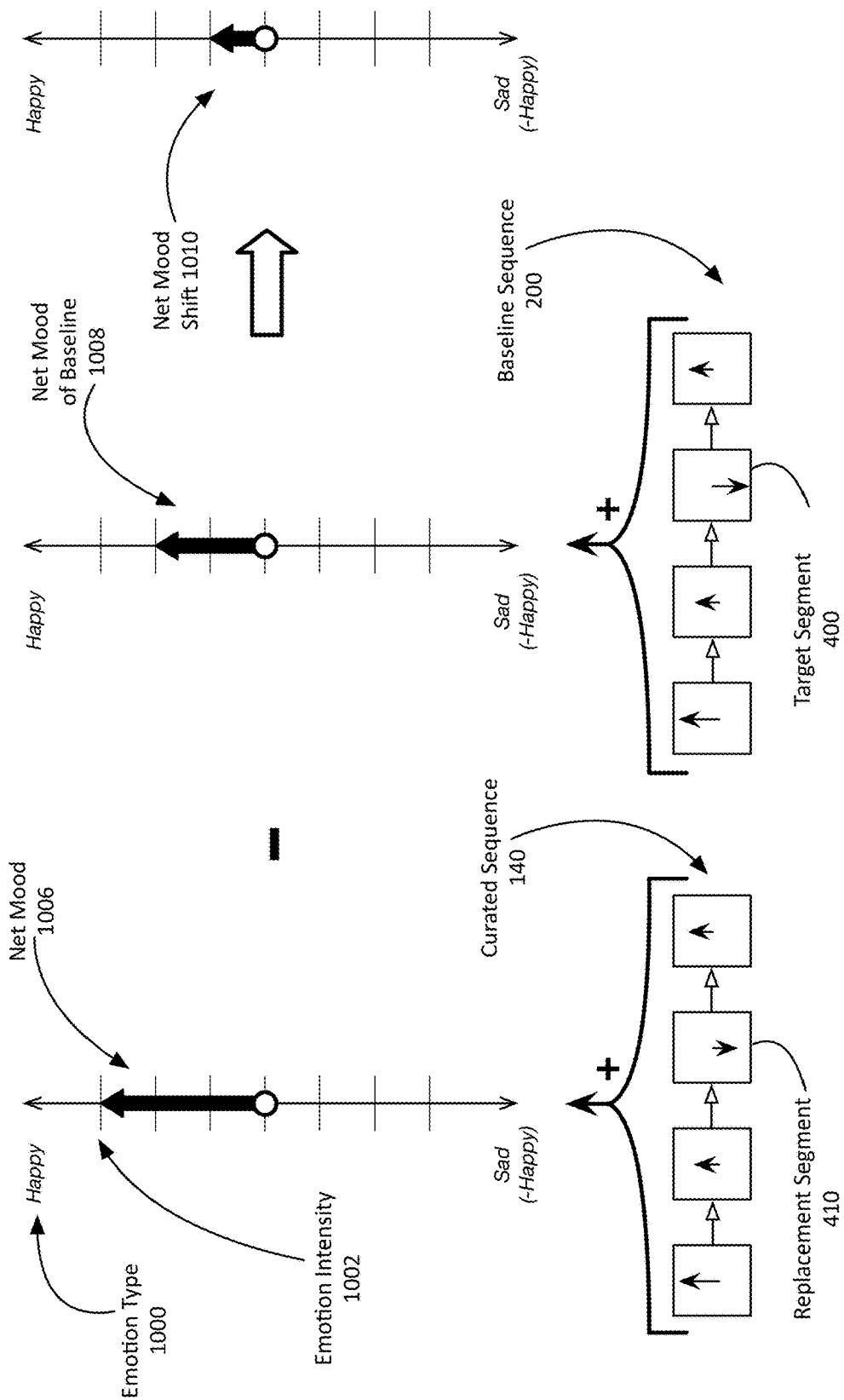
FIG. 10a is a schematic view of a net mood shift.
Figure 10B:
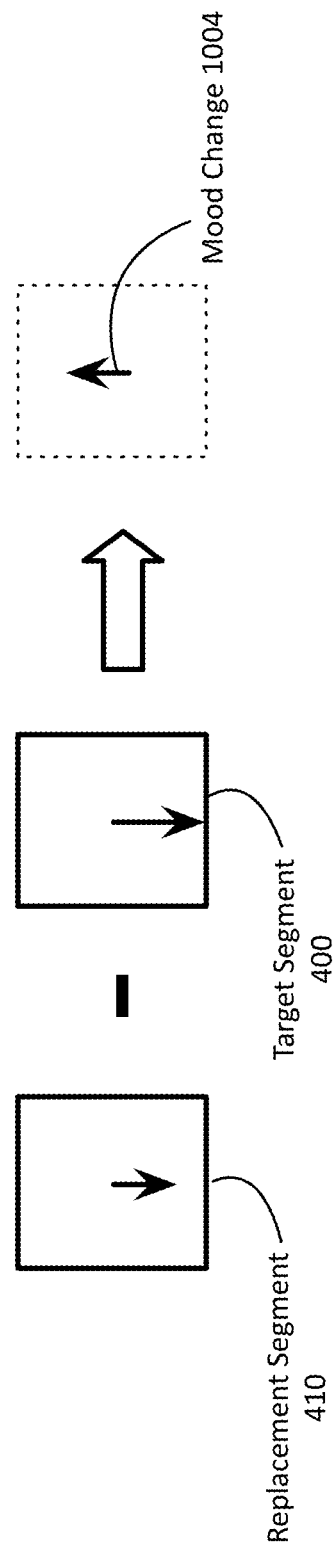
FIG. 10b is a schematic view of a mood change.
Figure 11:
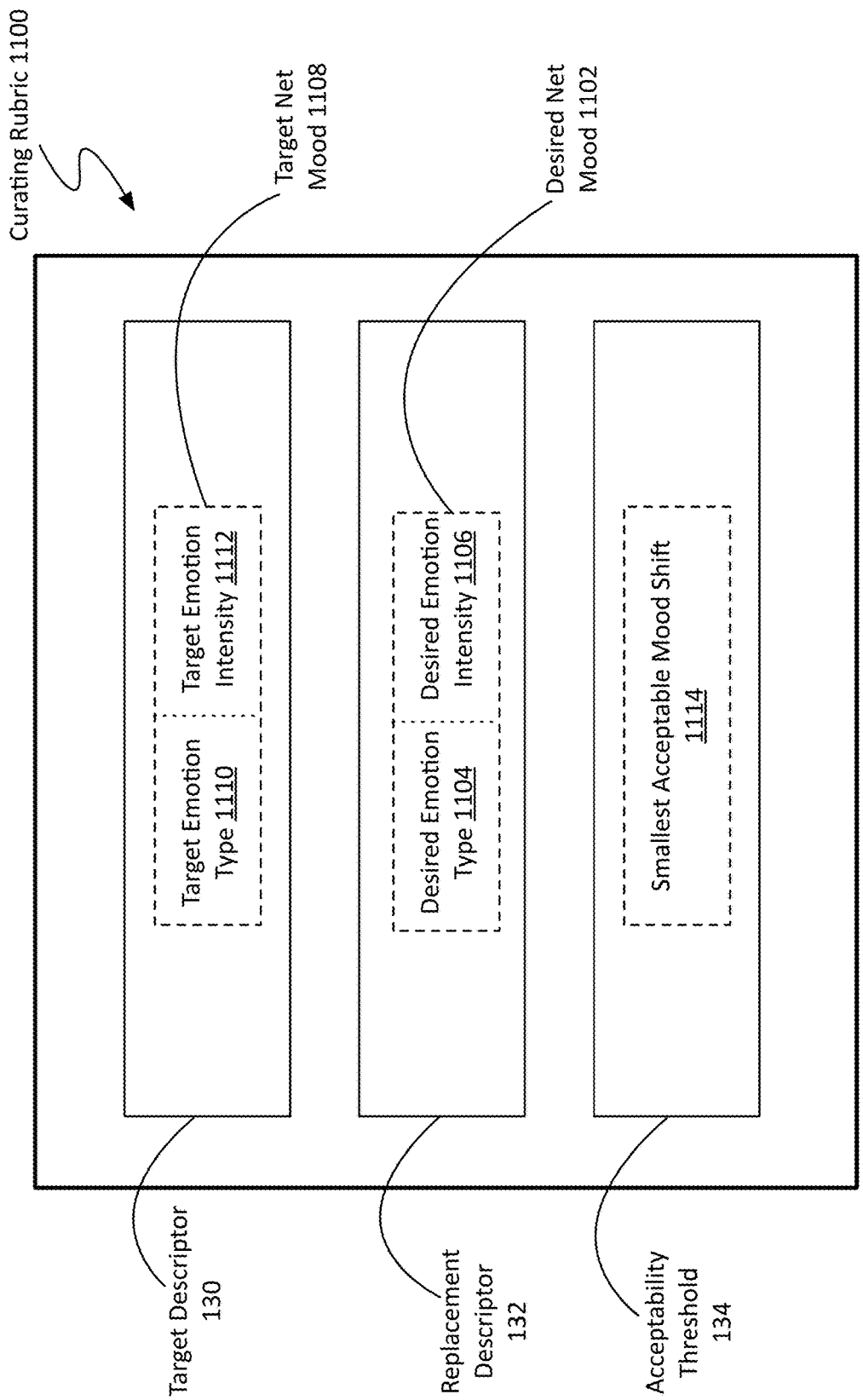
FIG. 11 is a schematic view of a curating rubric for modifying the net mood of a video sequence.

FIGS. 10 and 11 show a non-limiting example of how the VC system 100 may be used to modify the tone of a video sequence. Specifically, FIGS. 10a and 10b show schematic representations of a net mood shift and a mood change, respectively. FIG. 11 shows a schematic view of a curating rubric for modifying the net mood of a video sequence. As discussed with respect to FIG. 3, a number of metadata tags 112 may be attached to a video segment 114 to describe the tone or emotional content, including an emotion type 332 and an emotion intensity 334 associated with the emotion type.

Emotions can be incredibly subjective. Language is rife with words describing subtle variations among similar emotions (e.g. happiness, joy, satisfaction, upbeat, cheerful, etc.). Conventional methods for tagging video segments based upon emotional content have struggled with the subjective nature. Methods where taggers are free to provide their own tags result in a blurry mapping of emotions smeared across the many ways to convey a similar feeling. Methods where taggers are limited in their choice of emotion tags result in more clearly delineated boundaries, but are set; once chosen, any changes to the range of available emotional tags would require a reexamination of the entire body of previously tagged content in order to ensure accuracy. The main point of failure in conventional methods of emotional or mood related tags is the reliance on human taggers and their instinctive evaluation that is more subjective than quantified.

Advantageous over conventional methods, the VC system 100 makes use of a quantified system of emotional representation. According to various embodiments, emotions are represented as vectors that exist in a multi-dimensional "emotion space". FIGS. 10a and 10b show simplified examples of such a vector, having an emotion type 1000 (e.g. vector direction) and an emotion intensity 1002 (e.g. vector magnitude). The multidimensional emotion space is composed of dimensions that each represent an opposing pair of emotions. In the simplistic example shown in FIG. 10a, a single dimension is depicted, representing the emotional pairing of happy and sad. In other words, happiness is thought of as negative sadness; to make something more happy, happiness can be increased, or sadness can be decreased. Both changes are identical mathematically.

The use of a multi-dimensional emotion space to quantify moods is advantageous over conventional tagging methods for a number of reasons. The subtle variations in emotion may be accounted for using combinations of orthogonal vectors. Any subsequent redefinition of emotions can then be accomplished with a matrix operation projecting the old space into a new space, without requiring the reevaluation of previously tagged content by viewers. In this way, the topology of the emotional space can evolve over time, as more data is gathered from viewers (e.g. viewer confirmation of probationary tags 500, viewer ratings, reviews, etc.). Unlike conventional methods, the quantization of emotions used by the VC system 100 can evolve over time.

As a specific example of an evolving emotion space topology, in one embodiment, the VC system 100 may employ genetic algorithms to refine the definition of orthogonal vectors, using the viewer confirmation mechanism previously discussed to evaluate, or score, each iterative generation until a better topology is achieved. Other programmatic optimization methods, such as simulated annealing, may also be employed. This is advantageous over the conventional methods which rely on the subjective reactions of humans. Furthermore, while a human would never use vector math to determine their emotional response to a video segment, the VC system 100 may perform these operations at speed orders of magnitude greater than those of human taggers and evaluators.

According to various embodiments, a user 122 may configure a curating rubric 128 to generate a curated sequence 140 having a particular mood. See, for example, curating rubric 1100 of FIG. 11, where the replacement descriptor 132 comprises a desired net mood 1102 having a desired emotion type 1104 and desired emotion intensity 1106. In the context of the present description and the claims that follow, the net mood of a video sequence is the sum of the moods of the component video segments, the mood being a vector within the aforementioned multi-dimensional emotion space. In some embodiments, the net mood may be normalized by dividing by the number of video segments in the sequence (e.g. the average).

The portion of a target descriptor 130 dealing with emotional content is determined by the associated replacement descriptor 132. According to various embodiments, the target emotion type 1110 and associated target emotion intensity 1112 of the target descriptor 130 of a rubric 1100 may indicate an emotion type that is the opposite of the desired emotion type 1104, as well as an emotion type equal to the desired emotion type 1104 but having a target emotion intensity 1112 that is different from the desired emotion intensity 1106. In other words, according to various embodiments, the target descriptor 132 for targeting emotional content indicates anything that deviates from the desired net mood 1102.

Again, the vector representation of emotions employed by the VC system 100, according to various embodiments, is advantageous in that complex emotions are broken down into orthogonal base emotions, each base emotion having its own tag in the metadata 112. As discussed above, the way complex emotions break down into component orthogonal emotions is easy to modify without having to reevaluate an entire library. Furthermore, such a breakdown facilitates the recognition of opportunities for subtle changes. For example, a video sequence that conventional tagging may simply categorize as "scary" may have a small "funny" component that varies in alternate takes, providing an opportunity to increase or decrease "funny", per a curating rubric 128.

According to various embodiments, the replacement segment 410 chosen from the one or more potential replacement segments is the replacement segment 410 exhibiting a mood change 1004 toward the desired net mood 1102 specified in the rubric 1100. As shown in FIG. 10*b*, a mood change 1004 is the difference in mood between the target segment 400 and the replacement segment 410, in accordance with vector math. For example, in FIG. 10*b*, the replacement segment 410 has a mood in the sad direction with a magnitude of 1, and the target segment 400 has a mood in the sad direction with a magnitude of 2, yielding a mood change 1004 in the happy direction with a magnitude of 1. If the rubric 1100 specified a desired net mood 1102 of "happy" and a magnitude of 1, this might be a good substitution. However, if the rubric 1100 specified a desired net mood 1102 of "sad", this substitution would be counterproductive, and would thus not be performed, according to various embodiments.

Similar to other applications of the VC system 100 previously discussed, a curated sequence 140 may not be generated if the user's 122 requirements cannot be meet. For example, in some embodiments, a curated sequence will not be assembled and encoded unless it has a net mood 1006 substantially equal to the desired net mood 1102. In the context of the present description and the claims that follow, a net mood is substantially equal to a desired net mood when it is within at least 95% of the desired net mood. In embodiments employing an acceptability threshold 134, the curated sequence 140 may not be generated unless it is determined that it has a net mood shift 1010 within a specified smallest acceptable mood shift 1114 (e.g. the acceptability threshold 134). FIG. 10*a* shows that a net mood shift is the difference between the net mood 1006 of a potential curated sequence and the net mood 1008 of the base line sequence. Again, in some embodiments, these net moods are normalized as averages.

Another application of the VC system 100 is the generation of curated sequences 140 having a modified narrative. The multitude of unused content, and the identification of fungible segments, allows for the creation of variations in the narrative content of a baseline sequence. Fungible segments, such as establishing shots, improvisational takes, and the like, may be swapped out. Plot lines or characters may be removed. Segments may be reordered. According to various embodiments, the VC system 100 may be utilized to generate a curated sequence 140 having a narrative that is different than that of the baseline sequence 200.

Figure 12:
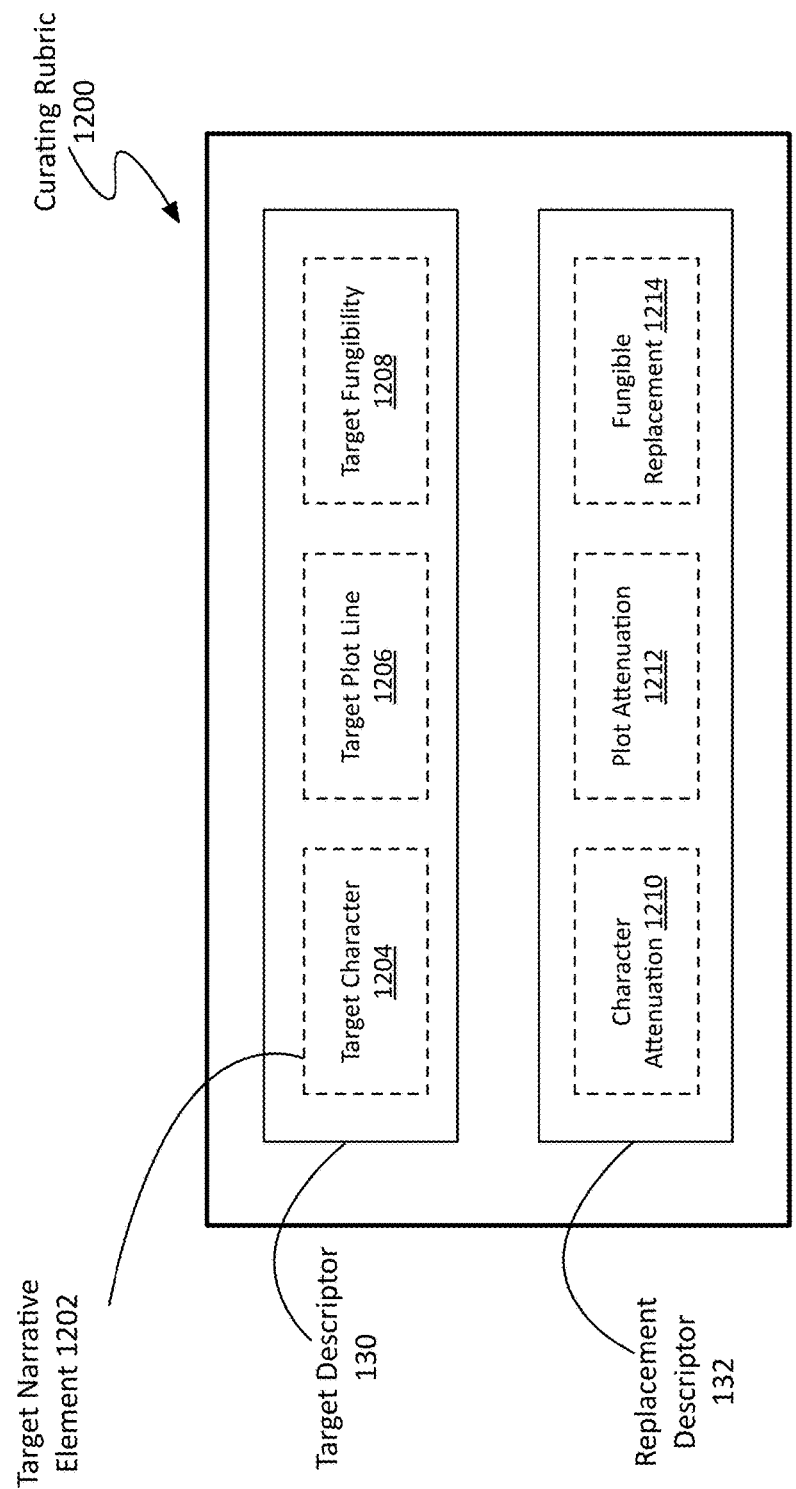
FIG. 12 is a schematic view of a curating rubric for modifying the narrative of a video sequence.

FIG. 12 shows a non-limiting example of a curating rubric 1200 for generating a curated sequence 140 having narrative modifications. As discussed with respect to FIG. 3, a number of metadata tags 112 may be attached to a video segment 114 to describe various narrative elements, including tags that identify a plot line 336, a character 338, and a chronology 342 (e.g. the segments place within a particular narrative timeline, etc.). Furthermore, a fungibility tag 340 may indicate that the segment is interchangeable with other segments having one or more similar attributes, as previously discussed.

According to various embodiments, a curating rubric 1200 for modifying the narrative of a baseline sequence may specify one or more target narrative elements 1202 within a target descriptor 130. For example, as shown in FIG. 12, the target descriptor 130 may specify one or more target characters 1204, target plot lines 1206, and/or target fungibility 1208, according to various embodiments.

The replacement descriptor 132 may vary, depending upon the target narrative elements 1202 specified in the target descriptor 130. For example, if a target character 1204 is identified (e.g. character name, actor name, etc.), the replacement descriptor may specify a character attenuation tag 1210, which may indicate whether the target character should be removed, or focused on. In some embodiments, a user 122 may specify the degree of attenuation or focus of a character. For example, the character attenuation tag 1210 may specify that scenes featuring the target character 1204 speaking should be removed, but segments where the character is visible but silent may be kept. As another example, a character attenuation tag 1210 may also specify one or more characters who, if present in a video segment, would prevent the segment from being removed.

If a target plot line 1206 is specified, the replacement descriptor 132 may comprise a plot attenuation tag 1212, which may specify whether the target plot line 1206 should be removed, or should become the focus of the curated sequence 140. In some embodiments, the plot attenuation tag 1212 may specify whether or not other plot lines should become casualties to the removal of the target plot line, either in general or for specific plot lines. For example, a user 122 may specify that the "Kim Bauer vs. a mountain lion" plot line should be removed from season 2 of the television show 24, but not when it intersects with the "nuclear bomb in Los Angeles" plot line.

If a target fungibility 1208 is specified, the replacement descriptor 132 may comprise a fungible replacement tag 1214, indicating the parameters that guide the choice of a fungible replacement. Specifically, the fungible replacement tag 1214 may identify the one or more tags that should be matched when examining the pool of potential replacement segments (e.g. the related segments indicated by the target segment having a fungible tag, etc.).

One exemplary application of a curated sequence 130 having a modified narrative is the enlivening of older shows. Swapping out fungible segments, like establishing shots, and alternative takes, like improvisational variations, can breathe new life into shows that viewers have already seen many times. Such modifications may motivate viewers to rewatch old favorites, providing the viewer with the thrill of feeling like they are watching the show again for the first time, while also providing the content provider with a way to increase revenue from older content, using only material that was already created.

Similarly, archived presentations of sporting events may attract new viewers when modified to include up-to-date statistics, alternate background clips, and alternate camera views of plays that may have been missed in the original, live airing of the event.

Figure 13:
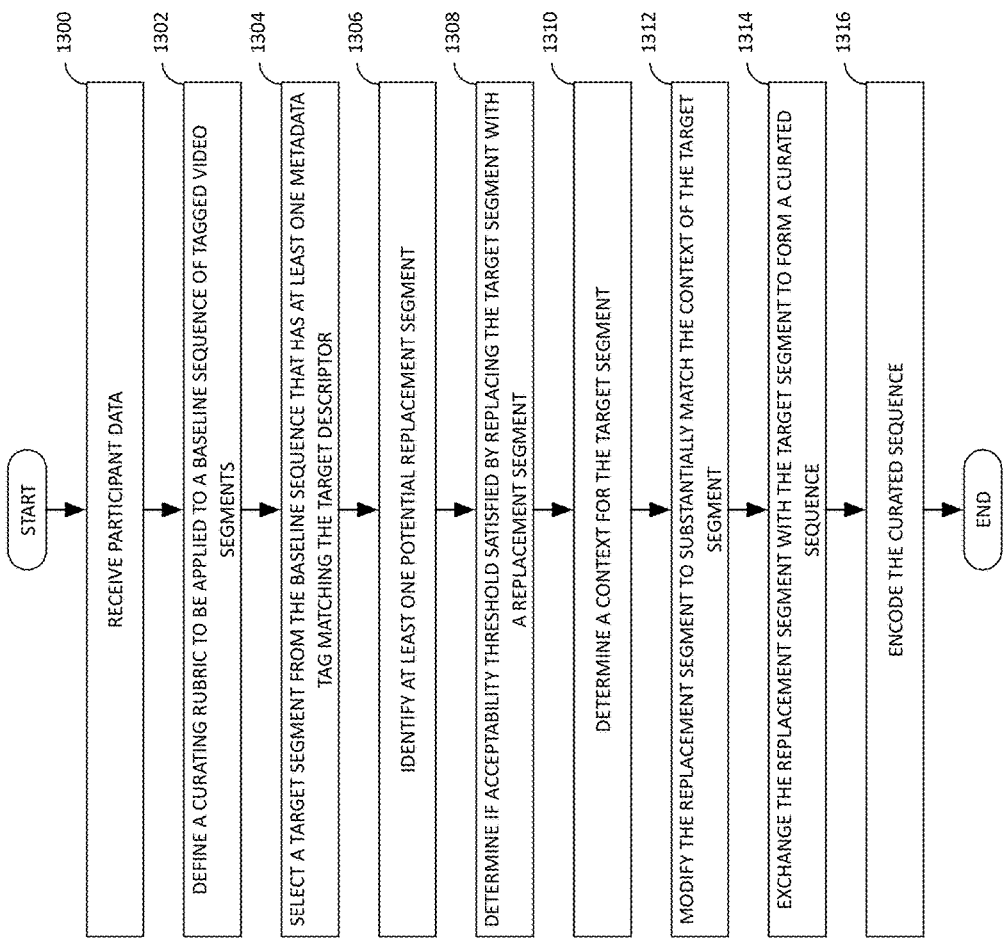
FIG. 13 is a process flow for generating a curated video sequence.

FIG. 13 shows a non-limiting example of a process for generating a curated video sequence. First, each of a plurality of video segments 114 associated with a show 204 is tagged with at least one metadata tag 112. See step 1300. As discussed above, the tags may be provided by editors, content creators, the artificial judge 108 of the VC server 102, and/or viewers 126. Next, a curating rubric 128 is defined, for application to a baseline sequence 200 of tagged video segments. The rubric 128 comprises a target descriptor 130, a replacement descriptor 132, and, in some embodiments, an acceptability threshold 134. See step 1302.

Next, a target segment 400 is selected from the baseline sequence 200 that has at least one metadata tag 112 matching the target descriptor 130. See step 1304. At least one potential replacement segment 408 is identified by referring to the tags of the target segment 400. See step 1306.

In the embodiments making use of an acceptability threshold, it is then determined if the acceptability threshold 134 would be satisfied by replacing the target segment 400 with a replacement segment 410. See step 1308. The replacement segment 410 is a potential replacement segment 408 having at least one metadata tag 112 matching the replacement descriptor 132.

A context 412 is then determined for the target segment 400. See step 1310. The context 412 may be determined using at least one of the target segment 400 and one or more neighbor segments 414 chosen from the baseline sequence 200 for being sequentially proximate to the target segment 400. The replacement segment 410 is then modified to substantially match the context 412 of the target segment 400 (step 1312), and then exchanged with the target segment to form a curated sequence 140 (step 1314). Finally, the curated sequence 140 is encoded in preparation for streaming to a viewer 126. See step 1316.

Figure 14:
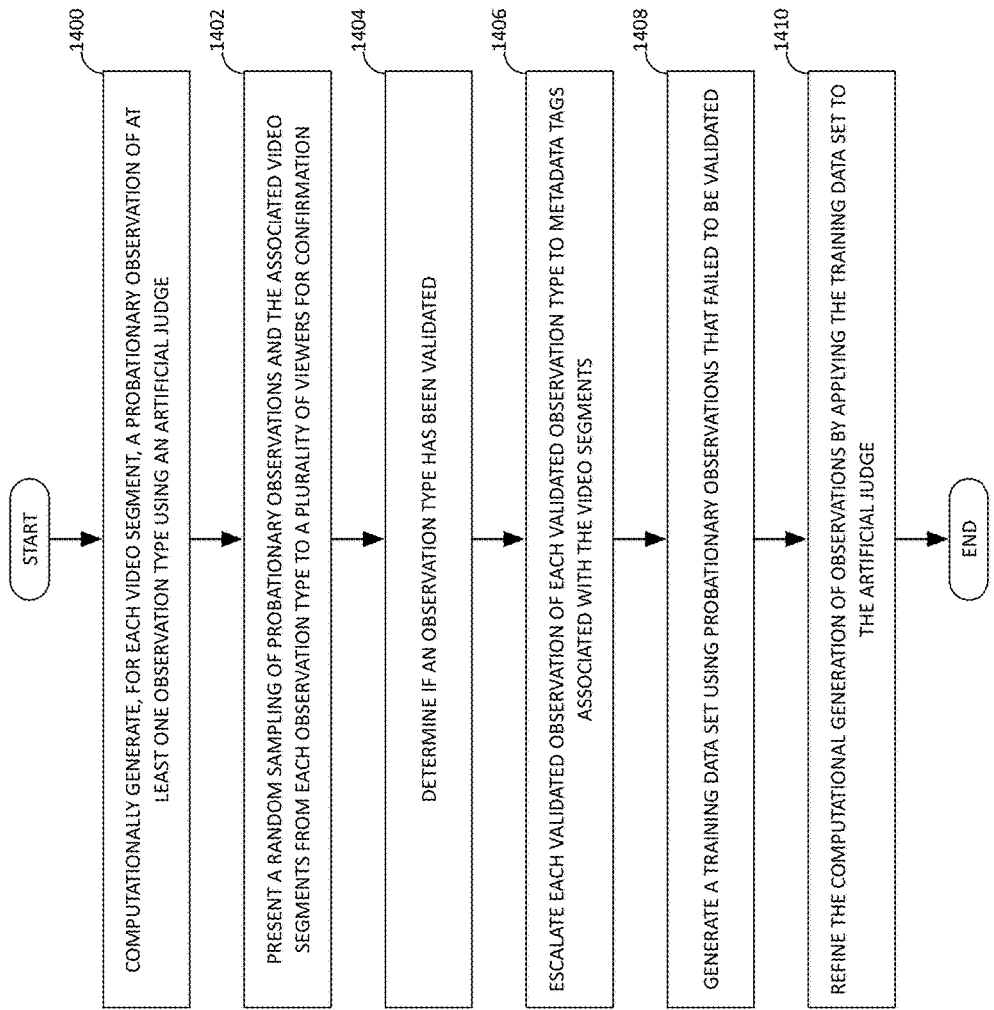
FIG. 14 is a process flow for programmatically tagging video segments for use with a VC system.

FIG. 14 shows a non-limiting example of a method for automatically, programmatically tagging video segments for use in the VC system 100. First, a probationary observation 500 is computationally generated for each video segment 114 using an artificial judge 108. See step 1400. As previously discussed, the artificial judge 108 may employ technologies including, but not limited to, natural language processing, facial recognition, chromatic decomposition, emotion recognition through machine vision, and tonal decomposition of sound.

After probationary observations 500 have been generated, a random sampling 524 of probationary observations 500 and their associated video segments 114, from each observation type 512, are presented to a plurality of viewers 126 for confirmation. See step 1402. As viewer responses 526 are received, it is determined whether an observation type 512 has been validated, as discussed above. See step 1404.

For observation types that have been validated, each validated observation is then escalated to a metadata tag 112 associated with the video segment 114. See step 1406. A training data set 532 is generated using the probationary observations 500 that failed to be validated (step 1408), and is then applied to the artificial judge 108 to refine the computational generation of observations (step 1410).

Figure 15:
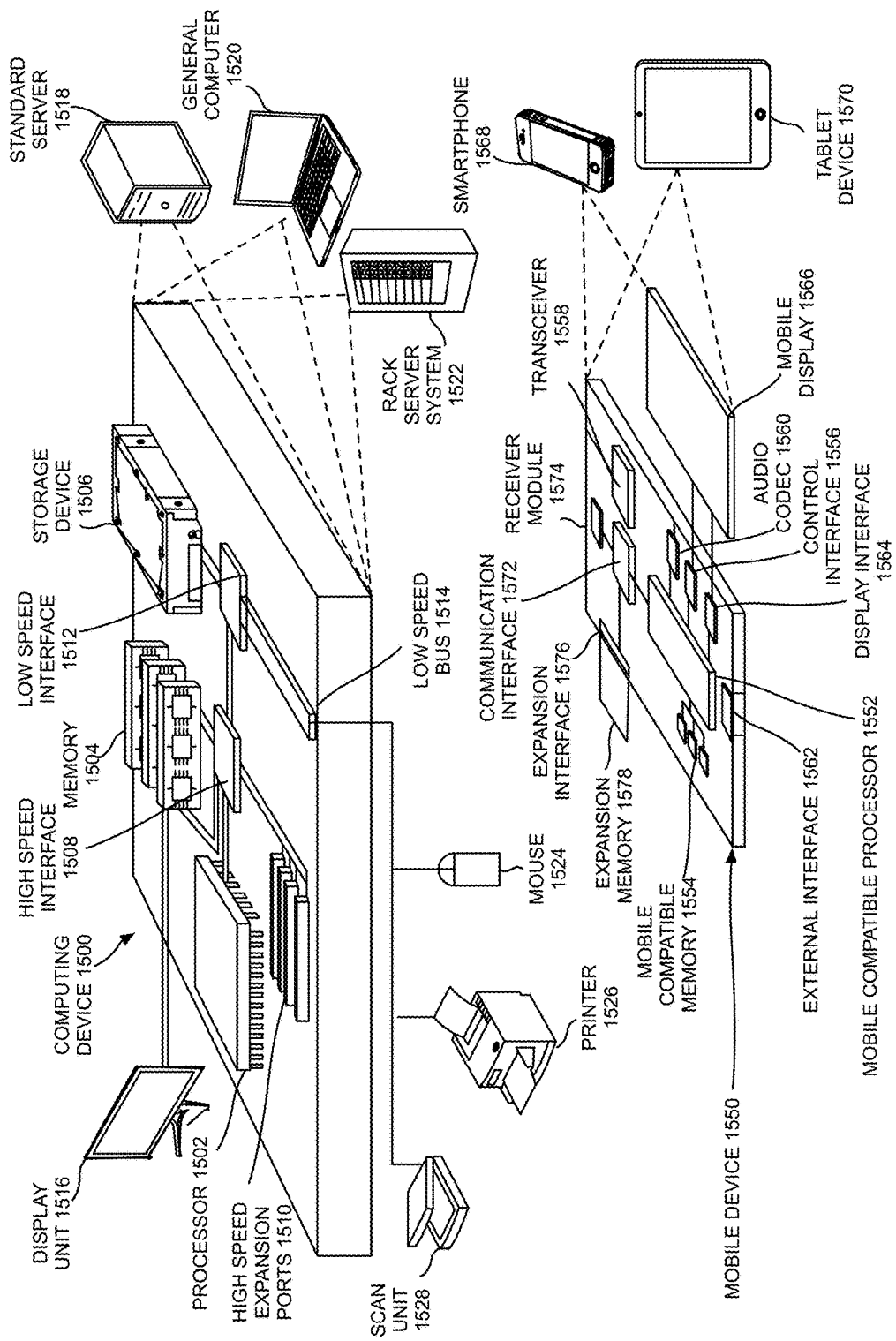
FIG. 15 is a schematic diagram of specific computing device that may be used to implement the methods and systems disclosed herein, according to one or more embodiments.

FIG. 15 is a schematic diagram of specific computing device 1500 and a specific mobile computing device 1530 that can be used to perform and/or implement any of the embodiments disclosed herein. In one or more embodiments, VC server 102 and/or storage 110 of FIG. 1 may be the specific computing device 1500. Furthermore, in one or more embodiments, viewer device 124 and/or user device 120 of FIG. 1 may be the specific computing device 1500, mobile device 1550, or a device comprising similar components, such as a smart TV, a digital cinema projector, or the like.

The specific computing device 1500 may represent various forms of digital computers, such as laptops, desktops, workstations, personal digital assistants, servers, blade servers, mainframes, and/or other appropriate computers. The specific mobile computing device 1530 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed, according to one embodiment.

The specific computing device 1500 may include a processor 1503, a memory 1505, a storage device 1506, a high-speed interface 1508 coupled to the memory 1505 and a plurality of high-speed expansion ports 1510, and a low speed interface 1512 coupled to a low speed bus 1514 and a storage device 1506. In one embodiment, each of the components heretofore may be inter-coupled using various buses, and may be mounted on a common motherboard and/or in other manners as appropriate. The processor 1503 may process instructions for execution in the specific computing device 1500, including instructions stored in the memory 1505 and/or on the storage device 1506 to display a graphical information for a GUI on an external input/output device, such as a display unit 1516 coupled to the high-speed interface 1508, according to one embodiment.

In other embodiments, multiple processors and/or multiple buses may be used, as appropriate, along with multiple memories and/or types of memory. Also, a plurality of specific computing device 1500 may be coupled with, with each device providing portions of the necessary operations (e.g., as a server bank, a group of blade servers, and/or a multi-processor system).

The memory 1505 may be coupled to the specific computing device 1500. In one embodiment, the memory 1505 may be a volatile memory. In another embodiment, the memory 1505 may be a non-volatile memory. The memory 1505 may also be another form of computer-readable medium, such as a magnetic and/or an optical disk. The storage device 1506 may be capable of providing mass storage for the specific computing device 1500. In one embodiment, the storage device 1506 may be includes a floppy disk device, a hard disk device, an optical disk device, a tape device, a flash memory and/or other similar solid state memory device. In another embodiment, the storage device 1506 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in the memory 1505, the storage device 1506, a memory coupled to the processor 1503, and/or a propagated signal.

The high-speed interface 1508 may manage bandwidth-intensive operations for the specific computing device 1500, while the low speed interface 1512 may manage lower bandwidth-intensive operations. Such allocation of functions is exemplary only. In one embodiment, the high-speed interface 1508 may be coupled to the memory 1505, the display unit 1516 (e.g., through a graphics processor and/or an accelerator), and to the plurality of high-speed expansion ports 1510, which may accept various expansion cards.

In the embodiment, the low speed interface 1512 may be coupled to the storage device 1506 and the low speed bus 1514. The low speed bus 1514 may be comprised of a wired and/or wireless communication port (e.g., a Universal Serial Bus ("USB"), a Bluetooth® port, an Ethernet port, and/or a wireless Ethernet port). The low speed bus 1514 may also be coupled to the scan unit 1528, a printer 1526, a keyboard, a mouse 1524, and a networking device (e.g., a switch and/or a router) through a network adapter.

The specific computing device 1500 may be implemented in a number of different forms, as shown in the figure. In one embodiment, the specific computing device 1500 may be implemented as a standard server 1518 and/or a group of such servers. In another embodiment, the specific computing device 1500 may be implemented as part of a rack server system 1522. In yet another embodiment, the specific computing device 1500 may be implemented as a general computer 1520 such as a laptop or desktop computer. Alternatively, a component from the specific computing device 1500 may be combined with another component in a specific mobile computing device 1530. In one or more embodiments, an entire system may be made up of a plurality of specific computing device 1500 and/or a plurality of specific computing device 1500 coupled to a plurality of specific mobile computing device 1530.

In one embodiment, the specific mobile computing device 1530 may include a mobile compatible processor 1532, a mobile compatible memory 1534, and an input/output device such as a mobile display 1546, a communication interface 1552, and a transceiver 1538, among other components. The specific mobile computing device 1530 may also be provided with a storage device, such as a microdrive or other device, to provide additional storage. In one embodiment, the components indicated heretofore are intercoupled using various buses, and several of the components may be mounted on a common motherboard.

The mobile compatible processor 1532 may execute instructions in the specific mobile computing device 1530, including instructions stored in the mobile compatible memory 1534. The mobile compatible processor 1532 may be implemented as a chipset of chips that include separate and multiple analog and digital processors. The mobile compatible processor 1532 may provide, for example, for coordination of the other components of the specific mobile computing device 1530, such as control of user interfaces, applications run by the specific mobile computing device 1530, and wireless communication by the specific mobile computing device 1530.

The mobile compatible processor 1532 may communicate with a user through the control interface 1536 and the display interface 1544 coupled to a mobile display 1546. In one embodiment, the mobile display 1546 may be a Thin-Film-Transistor Liquid Crystal Display ("TFT LCD"), an Organic Light Emitting Diode ("OLED") display, and another appropriate display technology. The display interface 1544 may comprise appropriate circuitry for driving the mobile display 1546 to present graphical and other information to a user. The control interface 1536 may receive commands from a user and convert them for submission to the mobile compatible processor 1532.

In addition, an external interface 1542 may be provided in communication with the mobile compatible processor 1532, so as to enable near area communication of the specific mobile computing device 1530 with other devices. External interface 1542 may provide, for example, for wired communication in some embodiments, or for wireless communication in other embodiments, and multiple interfaces may also be used.

The mobile compatible memory 1534 may be coupled to the specific mobile computing device 1530. The mobile compatible memory 1534 may be implemented as a volatile memory and a non-volatile memory. The expansion memory 1558 may also be coupled to the specific mobile computing device 1530 through the expansion interface 1556, which may comprise, for example, a Single In-Line Memory Module ("SIMM") card interface. The expansion memory 1558 may provide extra storage space for the specific mobile computing device 1530, or may also store an application or other information for the specific mobile computing device 1530.

Specifically, the expansion memory 1558 may comprise instructions to carry out the processes described above. The expansion memory 1558 may also comprise secure information. For example, the expansion memory 1558 may be provided as a security module for the specific mobile computing device 1530, and may be programmed with instructions that permit secure use of the specific mobile computing device 1530. In addition, a secure application may be provided on the SIMM card, along with additional information, such as placing identifying information on the SIMM card in a manner preventing unauthorized access.

The mobile compatible memory may include a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on the mobile compatible memory 1534, the expansion memory 1558, a memory coupled to the mobile compatible processor 1532, and a propagated signal that may be received, for example, over the transceiver 1538 and/or the external interface 1542.

The specific mobile computing device 1530 may communicate wirelessly through the communication interface 1552, which may be comprised of a digital signal processing circuitry. The communication interface 1552 may provide for communications using various modes and/or protocols, such as, a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 1538 (e.g., radio-frequency transceiver). In addition, short-range communication may occur, such as using a Bluetooth®, Wi-Fi, and/or other such transceiver. In addition, a GPS ("Global Positioning System") receiver module 1554 may provide additional navigation-related and location-related wireless data to the specific mobile computing device 1530, which may be used as appropriate by a software application running on the specific mobile computing device 1530.

The specific mobile computing device 1530 may also communicate audibly using an audio codec 1540, which may receive spoken information from a user and convert it to usable digital information. The audio codec 1540 may likewise generate audible sound for a user, such as through a speaker (e.g., in a handset smartphone of the specific mobile computing device 1530). Such a sound may comprise a sound from a voice telephone call, a recorded sound (e.g., a voice message, a music files, etc.) and may also include a sound generated by an application operating on the specific mobile computing device 1530.

The specific mobile computing device 1530 may be implemented in a number of different forms, as shown in the figure. In one embodiment, the specific mobile computing device 1530 may be implemented as a smartphone 1548. In another embodiment, the specific mobile computing device 1530 may be implemented as a personal digital assistant ("PDA"). In yet another embodiment, the specific mobile computing device, 1530 may be implemented as a tablet device 1550.

Various embodiments of the systems and techniques described here can be realized in a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including one programmable processor, which may be special or general purpose, coupled to receive data and instructions from, and to transmit data and instructions to, a storage system, one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse by which the user can provide input to the computer. Other kinds of devices can be used to provide for interaction with a user as well; for example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that includes a back-end component (e.g., as a data server), a middleware component (e.g., an application server), a front-end component (e.g., a client computer having a graphical user interface, and/or a Web browser through which a user can interact with an embodiment of the systems and techniques described here), and a combination thereof. The components of the system may also be coupled through a communication network.

The communication network may include a local area network ("LAN") and a wide area network ("WAN") (e.g., the Internet). The computing system can include a client and a server. In one embodiment, the client and the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

Where the above examples, embodiments and implementations reference examples, it should be understood by those of ordinary skill in the art that other dynamic video systems, methods, and examples could be intermixed or substituted with those provided. In places where the description above refers to particular embodiments of a VC system and video content customization methods, it should be readily apparent that a number of modifications may be made without departing from the spirit thereof and that these embodiments and implementations may be applied to other video technologies as well. Accordingly, the disclosed subject matter is intended to embrace all such alterations, modifications and variations that fall within the spirit and scope of the disclosure and the knowledge of one of ordinary skill in the art.

What is claimed is:

1. A computer-implemented method of providing curated video, comprising:
   tagging, by an editing device during editing process where original content was created by content provider, each of a plurality of video segments associated with a show with at least one metadata tag;
   defining, by a user using a user device, a curating rubric to be applied to a baseline sequence of video segments that is at least a subset of the plurality of video segments, the curating rubric comprising a target descriptor and a replacement descriptor associated with the target descriptor;
   selecting, by a video curating server, a target segment having at least one metadata tag matching the target descriptor of the curating rubric, the target segment being selected from among the baseline sequence;
   identifying, by the video curating server, a potential replacement segment with data link to one of the plurality of video segments associated with the show based on the at least one metadata tag associated with each of the plurality of video segments by referring to one of the at least one metadata tag of the target segment;
   in response to determining the potential replacement segment that matches the target segment, replacing one of the plurality of video segments of the video with the potential replacement segment to generate sequence of the curated video;
   in response to determining the potential replacement segment that does not match the target segment, automatically determining by the video curating server, a context for the target segment using the target segment and one or more neighbor segments chosen from the baseline sequence for being sequentially adjacent to the target segment, wherein the context of the target segment is at least one attribute shared by the target segment and the one or more neighbor segments sequentially adjacent to the target segment and not shared by the potential replacement segment;

modifying a replacement segment to substantially match the context of the target segment such that the replacement segment shares the at least one attribute of the context with the one or more neighbor segments so that the replacement segment may be joined to the one or more neighbor segments similar to how the target segment is joined to the one or more neighbor segments, wherein the replacement segment is the potential replacement segment having at least one metadata tag consistent with the replacement descriptor associated with the target descriptor; wherein modifying the replacement segment to substantially match the context of the target segment further comprises applying a watermark unique to the viewer to the replacement segment, the watermark being codec resistant;

exchanging the replacement segment with the target segment within the baseline sequence to form a curated sequence of video segments; and encoding the curated sequence in preparation for streaming to a viewer.

2. The method of claim 1, wherein tagging each of the plurality of video segments associated with the show further comprises:

computationally generating, for each video segment, a probationary observation of at least one observation type that describes the video segment as considered using an artificial judge comprising at least one of natural language processing, facial recognition, chromatic decomposition, emotion recognition through machine vision, and tonal decomposition of at least one of an audio track and a scoring track;

subjectively validating observations for each of the at least one observation type by presenting a random sampling of probationary observations to a plurality of viewers for confirmation, the random sampling being statistically representative and non-exclusionary of a plurality of distinct observations made of the plurality of video segments; and recording each validated observation of each validated observation type as one of the at least one metadata tags for the associated video segment in response to the confirmation of substantially all of the random sampling for said observation type by the plurality of viewers.

3. The method of claim 2, further comprising:

generating a training data set based upon probationary observations that received negative responses from the plurality of viewers, and refining the computational generation of probationary observations by applying the training data set to the artificial judge.

4. The method of claim 2, wherein the at least one observation type comprises at least one of a product avatar, a sensitive content, a tone, and a character.

5. The method of claim 1, wherein: one of the at least one metadata tag of one video segment of the plurality of video segments describes a replaceable product by specifying at least one of a product type, a temporal data, and a geometric data, the replaceable product being a product visible in the video segment whose replacement is without legal constraint;

the target descriptor comprises at least one of a target product type, a target duration, and a target geometry;

the replacement descriptor associated with the target descriptor comprises at least one of a replacement product image, a replacement product video segment, and a replacement product model;

identifying the potential replacement segment comprises determining whether the replacement segment has been partially generated, and further comprises generating and storing a partially generated replacement segment upon determination that the replacement segment has not been partially generated, the partially generated replacement segment comprising the target segment with the replaceable product removed; and modifying the replacement segment to substantially match the context of the target segment further comprises one of retrieving the replacement segment and generating the replacement segment using the partially generated replacement segment.

6. The method of claim 5, wherein tagging each of the plurality of video segments associated with a show further comprises:

determining whether a video segment of the plurality of video segments comprises a visible product;

identifying the visible product;

determining whether the visible product is replaceable by searching at least one legal agreement associated with the show, and tagging the video segment with at least one metadata tag describing the replaceable product.

7. The method of claim 1: wherein one of the at least one metadata tag of one video segment of the plurality of video segments describes a sensitive content by specifying at least one of a content type, a content medium, a temporal data, and a geometric data, the sensitive content consisting of a representation of at least one of violence, substance abuse, profanity, nudity, sex, and content consequential to content rating, and the content medium specifying either aural or visual;

wherein the target descriptor comprises a target content type;

wherein the replacement descriptor associated with the target descriptor comprises a lowest allowable replacement source; and wherein the replacement segment is the potential replacement segment having a replaced content type metadata tag matching the target content type and a content replacement source metadata tag that at least meets the lowest allowable replacement source of the replacement descriptor.

8. The method of claim 7, further comprising generating the replacement segment if a potential replacement segment cannot be found and the lowest allowable replacement source of the replacement descriptor allows for system-generated content replacement, generating the replacement segment comprising one of removing the sensitive content from the target segment, obscuring the sensitive content within the target segment, and replacing the sensitive content, in accordance with the lowest allowable replacement source and based upon the one or more metadata tags of the target segment.

9. The method of claim 1, wherein: one of the at least one metadata tag of each video segment of the plurality of video segments describes a mood by specifying at least an emotion type and an emotional intensity associated with the emotion type;

the replacement descriptor comprises a desired net mood having at least one desired emotion type, and a desired emotion intensity for each desired emotion type;

the target descriptor comprises at least one target emotion type, and a target emotion intensity for each target emotion type, each of the at least one target motion type being either counter to one of the at least one desired emotion types or equal to one of the at least one desired emotion types and having an associated target emotion intensity different than the associated desired emotion intensity;

identifying the potential replacement segment comprises identifying at least one potential replacement segment;

the replacement segment is the potential replacement segment of the at least one potential replacement segment exhibiting a mood change toward the desired net mood of the curating rubric, the mood change being the mood of the target segment subtracted from the mood of the potential replacement segment; and encoding the curated sequence first comprises determining whether the curated sequence has a net mood substantially equal to the desired net mood, the net mood being the sum of moods associated with all segments within the curated sequence.

10. The method of claim 1, wherein: one of the at least one metadata tag of each video segment of the plurality of video segments is a narrative element indicating one of a plot line, a character, and a fungibility;

the target descriptor comprises a target narrative element indicating one of a target character, a target plot line, and a target fungibility, and the replacement descriptor associated with the target descriptor comprises one of a character attenuation tag indicating the removal of the target character, a plot attenuation tag indicating the removal of the target plot line, and a fungible replacement tag.

11. A computer-implemented method of providing curated video, comprising:

tagging, by an editing device during editing process where original content was created by content provider, each of a plurality of video segments associated with a show with at least one metadata tag;

defining, by a user using a user device, a curating rubric to be applied to a baseline sequence of video segments that is at least a subset of the plurality of video segments, the curating rubric comprising a target descriptor, a replacement descriptor associated with the target descriptor, and an acceptability threshold;

selecting, by a video curating server, a target segment having at least one metadata tag matching the target descriptor of the curating rubric, the target segment being selected from among the baseline sequence;

identifying, by the video curating server, a potential replacement segment with data link to one of the plurality of video segments associated with the show based on the at least one metadata tag associated with each of the plurality of video segments by referring to one of the at least one metadata tag of the target segment;

determining if the acceptability threshold of the curating rubric would be satisfied by replacing the target segment with a replacement segment, wherein the replacement segment is the potential replacement segment having at least one metadata tag matching the replacement descriptor associated with the target descriptor;

in response to determining the potential replacement segment that matches the target segment, replacing one of the plurality of video segments of the video with the potential replacement segment to generate sequence of the curated video; wherein the replacement segment is the potential replacement segment having at least one metadata tag matching the replacement descriptor associated with the target descriptor;

in response to determining the potential replacement segment that does not match the target segment, automatically determining by the video curating server, a context for the target segment using the target segment and one or more neighbor segments chosen from the baseline sequence for being sequentially adjacent to the target segment;

modifying the replacement segment to substantially match the context of the target segment, wherein modifying the replacement segment to substantially match the context of the target segment further comprises applying a watermark unique to the viewer to the replacement segment, the watermark being codec resistant;

exchanging the replacement segment with the target segment within the baseline sequence to form a curated sequence of video segments; and encoding the curated sequence in preparation for streaming to a viewer.

12. The method of claim 11, wherein:

tagging each of the plurality of video segments associated with the show further comprises determining whether a video segment of the plurality of video segments comprises a visible product, identifying the visible product, determining whether the visible product is a replaceable product, and tagging the video segment with at least one metadata tag describing the replaceable product;

one of the at least one metadata tag of one video segment of the plurality of video segments describes the replaceable product by specifying at least one of a product type, a temporal data, and a geometric data, the replaceable product being a product visible in the video segment whose replacement is without legal constraint;

the target descriptor comprises at least one of a target product type, a target duration, and a target geometry;

determining whether the acceptability threshold is a lowest acceptable product impact score;

the replacement descriptor associated with the target descriptor comprises at least one of a replacement product image, a replacement product video segment, and a replacement product model;

identifying the potential replacement segment comprises determining whether the replacement segment has been partially generated, and further comprises generating and storing a partially generated replacement segment upon determination that the replacement segment has not been partially generated, the partially generated replacement segment comprising the target segment with the replaceable product removed;

determining whether the acceptability threshold would be satisfied comprises determining whether a weighted product impact score associated with the potential replacement segment is greater than the lowest acceptable product impact score, the weighted product impact score is a function of a fractional area of a frame, a duration, and a visibility weighting; and modifying the replacement segment to substantially match the context of the target segment further comprises one of retrieving the replacement segment and generating the replacement segment using a partially generated replacement segment.

13. The method of claim 11, wherein:
one of the at least one metadata tag of one video segment of the plurality of video segments describes a sensitive content by specifying at least one of a content type, a content medium, a temporal data, and a geometric data, the sensitive content consisting of a depiction of at least one of an act of violence, an act of substance abuse, an act of profanity, an act of nudity, a sexual act, and an act consequential to content rating, and the content medium specifying either aural or visual;
the target descriptor comprises a target content type;
the acceptability threshold describes a lowest allowable replacement source; and
the replacement segment is the potential replacement segment having a replaced content type metadata tag matching the target content type and a content replacement source metadata tag that at least meets the acceptability threshold.

14. The method of claim 13, further comprising generating the replacement segment whether a potential replacement segment cannot be found and the acceptability threshold allows for system-generated content replacement, generating the replacement segment comprising one of removing the sensitive content from the target segment, obscuring the sensitive content within the target segment, and replacing the sensitive content, in accordance with the acceptability threshold and based upon the one or more metadata tags of the target segment.

15. The method of claim 11, wherein:
one of the at least one metadata tag of each video segment of the plurality of video segments describes a mood by specifying at least an emotion type and an emotional intensity associated with the emotion type;
the replacement descriptor comprises a desired net mood having at least one desired emotion type, and a desired emotion intensity for each desired emotion type;
the acceptability threshold describes a smallest acceptable mood shift;
the target descriptor comprises at least one target emotion type, and a target emotion intensity for each target emotion type, each of the at least one target motion type being either counter to one of the at least one desired emotion types or equal to one of the at least one desired emotion types and having an associated target emotion intensity different than the associated desired emotion intensity;
identifying the potential replacement segment comprises identifying at least one potential replacement segment;
the replacement segment is the potential replacement segment of the at least one potential replacement segment exhibiting a mood change toward the desired net mood of the curating rubric, the mood change being the mood of the target segment subtracted from the mood of the potential replacement segment; and
encoding the curated sequence first comprises determining whether the curated sequence has a net mood shift within the acceptability threshold, the net mood shift being the difference between the sum of moods associated with all segments within the curated sequence and the sum of moods associated with all segments within the baseline sequence.

16. The method of claim 11, wherein encoding the curated sequence comprises encoding the replacement segment in combination with pre-encoded segments of the baseline sequence.

17. A video curating system, comprising:
a storage comprising a plurality of video segments associated with a show, each video segment of the plurality of video segments having at least one metadata tag created by an editing device during editing process where original content was created by content provider;
a video curating server communicatively coupled to the storage and a network and having a first processor and a first memory, the video curating server configured to:
receive a curating rubric to be applied to a baseline sequence of video segments that is at least a subset of the plurality of video segments, the curating rubric received through the network from a user device and comprising a target descriptor and a replacement descriptor associated with the target descriptor;
select a target segment from among the baseline sequence, the target segment having at least one metadata tag matching the target descriptor of the curating rubric;
identify a potential replacement segment with data link to one of the plurality of video segments associated with the show based on the at least one metadata tag associated with each of the plurality of video segments by referring to the at least one metadata tag of the target segment;
in response to determining the potential replacement segment that matches the target segment, replace one of the plurality of video segments of the video with the potential replacement segment to generate sequence of the curated video;
in response to determining the potential replacement segment that does not match the target segment, automatically determine a context for the target segment using the target segment and one or more neighbor segments chosen from the baseline sequence for being sequentially proximate adjacent to the target segment, wherein the context of the target segment is at least one attribute shared by the target segment and the one or more neighbor segments sequentially adjacent to the target segment and not shared by the potential replacement segment;
modify a replacement segment to substantially match the context of the target segment, wherein the replacement segment is the potential replacement segment having at least one metadata tag consistent with the replacement descriptor associated with the target descriptor, wherein modifying the replacement segment to substantially match the context of the target segment further comprises applying a watermark unique to the viewer to the replacement segment, the watermark being codec resistant;
exchange the replacement segment with the target segment within the baseline sequence to form a curated sequence of video segments; and
encode the curated sequence in preparation for streaming to a viewer device through the network.

18. The system of claim 17, wherein the video curating server is further configured to tag each of the plurality of video segments with at least one metadata tag.

19. The system of claim 17, wherein the video curating server is further configured to:
automatically generate, for each video segment, a probationary observation of at least one observation type that describes the video segment, the probationary observation generated using at least one of natural language processing, facial recognition, chromatic decomposition, emotion recognition through machine vision, and tonal decomposition of at least one of an audio track and a scoring track;

stream, over the network, a random sampling of probationary observations for each of the at least one observation type to a plurality of viewer devices for subjective validation, the random sampling being statistically representative and non-exclusionary of a plurality of distinct observations made of the plurality of video segments;

receive a plurality of responses from the plurality of viewer devices in response to the transmission of the random sampling of probationary observations; and record each validated observation of each validated observation type as one of the at least one metadata tags for the associated video segment in response to the validation of substantially all of the random sampling for said observation type through the plurality of viewer devices.

\* \* \* \* \*